United States Patent
Reimann et al.

(10) Patent No.: US 10,949,924 B2
(45) Date of Patent: Mar. 16, 2021

(54) INTER-ARRIVAL TIMES TRIGGERED, PROBABILISTIC RISK TRANSFER SYSTEM AND A CORRESPONDING METHOD THEREOF

(71) Applicant: Swiss Reinsurance Company Ltd., Zurich (CH)

(72) Inventors: Stefan Reimann, Zürich (CH); Marc Wüest, Kappel am Albis (CH); David Baumgartner, Zürich (CH)

(73) Assignee: Swiss Reinsurance Company Ltd., Zurich (CH)

(*) Notice: Subject to any disclaimer, the term of this patent is extended or adjusted under 35 U.S.C. 154(b) by 643 days.

(21) Appl. No.: 15/593,485

(22) Filed: May 12, 2017

(65) Prior Publication Data

US 2018/0114272 A1    Apr. 26, 2018

Related U.S. Application Data

(63) Continuation of application No. PCT/EP2016/075440, filed on Oct. 21, 2016.

(51) Int. Cl.
*G06Q 40/00* (2012.01)
*G06Q 40/08* (2012.01)
(Continued)

(52) U.S. Cl.
CPC ............ *G06Q 40/08* (2013.01); *G06N 5/022* (2013.01); *G06N 7/005* (2013.01)

(58) Field of Classification Search
CPC ......... G06Q 40/08; G06N 5/022; G06N 7/005
(Continued)

(56) References Cited

U.S. PATENT DOCUMENTS

| | | | | |
|---|---|---|---|---|
| 4,766,539 A | * | 8/1988 | Fox .................... | G06Q 40/02 705/4 |
| 7,523,065 B2 | * | 4/2009 | Eder ................... | G06Q 40/00 705/35 |

(Continued)

OTHER PUBLICATIONS

Michael E. Olczyk; "Flood Risk Perception in the red river basin, Manitoba implications for hazard and disaster management"; University of Manitoba; Winnipeg. (Year: 2004).*

*Primary Examiner* — Edward Chang
(74) *Attorney, Agent, or Firm* — Oblon, McClelland, Maier & Neustadt, L.L.P.

(57) ABSTRACT

An automated, inter-arrival-time-based system and method for automated prediction and exposure-signaling of associated, catastrophic risk-event driven or triggered risk-transfer systems, for low frequency catastrophic or operational risk events and automated risk-transfer. Risk-events are measured and assigned to a historic hazard set comprising event parameters for each assigned risk-event. Risk-exposed units and/or the automated risk-transfer systems are provided with corresponding risk-transfer parameters for automated risk-transfer and/or automated risk-event cover. An event loss set is based on the measured frequencies with associated losses of said risk-events of the hazard set, each of said risk-events creating a set specific loss. Time-stamps, based on an automatically and/or dynamically estimated distribution of corresponding inter-arrival times parameters, capture a waiting time between consecutive events of the period loss set. The waiting times measure the time intervals between two successive risk-events and capture peril specific temporal clustering and/or seasonal occurrence patterns.

15 Claims, 12 Drawing Sheets

US 10,949,924 B2

Page 2

(51) Int. Cl.
*G06N 5/02* (2006.01)
*G06N 7/00* (2006.01)

(58) Field of Classification Search
USPC .............................................. 705/4
See application file for complete search history.

(56) References Cited

U.S. PATENT DOCUMENTS

| | | | |
|---|---|---|---|
| 7,722,055 B2* | 5/2010 | Hall ................... | B60G 21/0555 280/5.502 |
| 8,290,793 B2* | 10/2012 | Aebischer .............. | G06Q 40/08 705/4 |
| 9,020,875 B1* | 4/2015 | Compton ............... | G06Q 40/08 706/46 |
| 2005/0027571 A1* | 2/2005 | Gamarnik ............. | G06Q 40/08 705/4 |
| 2008/0103841 A1* | 5/2008 | Lewis ................ | G06Q 10/0635 705/4 |
| 2008/0172262 A1* | 7/2008 | An .................. | G06Q 10/06375 705/7.37 |
| 2012/0143633 A1* | 6/2012 | Salghetti ............... | G06Q 40/08 705/4 |
| 2014/0095425 A1* | 4/2014 | Sipple ................... | G06N 7/005 706/52 |
| 2014/0149325 A1* | 5/2014 | Clifton ................ | G05B 23/024 706/12 |
| 2017/0126712 A1* | 5/2017 | Crabtree ............. | H04L 63/1425 |
| 2017/0132537 A1* | 5/2017 | Chavez ................ | G06Q 10/04 |

\* cited by examiner

INTER-ARRIVAL TIMES TRIGGERED, PROBABILISTIC RISK TRANSFER SYSTEM AND A CORRESPONDING METHOD THEREOF

FIELD OF THE INVENTION

The present invention relates to automated systems for predicting and exposure-based signaling, steering and/or operating catastrophic risk-event driven or triggered systems; in particular, these are automated risk-transfer systems or other systems and instruments intended to hedge against risk, e.g. weather-related risks, including catastrophic and other significant risks, be they weather-related or otherwise.

BACKGROUND OF THE INVENTION

Global industry and markets, in particular areas with a strong exposure, as, for example, in Bermuda, Honduras, Nicaragua or the Eastern shoreline and Gulf coast of the United States, significantly rely upon reliable systems and methods to automatically and quickly assess catastrophe exposures. The use of such exposure measurements may be varied as, for example, automated expert systems for exposure improvements, alarm systems or automated risk-transfer systems. If the predictions by such systems underestimate the potential losses arising from any given events, the industry as a whole may suffer capital exposures that are higher than expected and often untenable. Some catastrophic events may impact an industry so severely that this results in a complete breakdown of affected industry sectors. However, this is not only a strategic and risk management issue for exposed industries who wish to ensure their continued viability; in fact, the impact is also felt in the operation of automated risk-transfer systems and/or any regulatory capital requirements, since any risk-transfer must typically be balanced by sufficient amounts of pooled resources, i.e. an adequately performed catastrophic risk charge is generally a significant contributor in fulfillment of this technical requirement.

In the context of exposure-based signaling, steering and/or operating of catastrophic risk-event driven or triggered systems, the so called "Cat Return" sets out the extent of such reliance and put one of the technical bases of the operation of risk-transfer systems mitigating predicted risks, and monitoring and quantifying exposure to risk-transfer systems. It also can serve as a tool for assessing if inputs into catastrophe components are reasonable or if regulatory capital requirements are appropriate. Automated risk-transfer systems have in place operational procedures and measuring devices for monitoring surveying activities of predicted risks. This includes suitable resource-pooling (e.g., capital), leveraging and taking measurements, based on aggregate information such as exposure, and/or predicted statistically based probable maximum losses (PML). All technical and operational assumptions, including the testing of zonal, peril and other risk categorization dimensions, both within and between classes of industry and risk-exposed units, should be included. Prior art examples of types of measures and assessments of catastrophic risks for automated risk-transfer systems include, for example: (A) measuring the rank of PML and Realistic Disaster Scenarios (RDS) against the relative rank of various other cat exposure metrics. Discrepancies may exist in relative ranking possibly highlighting factors such as: (i) construction of a superior risk portfolio; (ii) a relatively higher or lower attachment point, relative to other industry sectors or markets, and the possibility of exposure to a greater model risk; and (iii) the application of different model mixes by region-specific peril and different levels of loss modification applied to gross results; (B) exposure assessments regarding catastrophic events extends beyond a predefined property catastrophe threshold. The measures may also assess the potential for a non-accumulated exposure relative to correlated catastrophic losses; (C) Considering supporting second risk-transfer system (e.g., reinsurance systems) or retrocessional protection against catastrophes, to assess the impact of second risk-transfer default; and (D) Monitoring and measuring relative changes of exposure from one year to the next for consistency and reasonableness. The Cat Return, in conjunction with other risk exposure data, is also used to assess the adequacy of resources or liquidity that may have been pooled. Liquidity risk is not always mitigated simply by holding additional capital. For automated risk-transfer systems, the ability to pay claims is obviously an important factor and perhaps even more pronounced in the arena of catastrophic risk where large amounts of capital may have to be liquidated at very short notice to pay claims. Additionally, complexities arise with currency mismatches and that may exist among the pooled resources of risk-transfer systems and a subset of potential catastrophic liabilities related thereto. The operation of an automated risk transfer system should be able to demonstrate that it can consider potential liquidity challenges, including the technical methodology and principles used to measure liquidity, contingency plans, access to new funding sources, and projected liquidity requirements. Examples of the kinds of measures that can be used to assess a system's liquidity risk include: (A) Measuring asset and liability correlations for certain scenarios, where it is likely that the often assumed independence of these items will collapse. Examples might include terrorism events or large CAT losses in Japan or the impact on the dollar-yen exchange rate; (B) The ratio of effective asset duration to effective liability duration; or (C) Measuring Gross and Net PML and RDS returns as a function of pooled resources or investments adjusted for encumbrances. Thus, pooled resources of risk-transfer systems should amount to such a level that operations can withstand the impact of the occurrence of a combination of extreme, but not inconceivable, adverse events. A well operated risk-transfer system will withstand comprehensive stress and scenario testing procedures in efforts of monitoring resource-pooling adequacy in adverse scenarios as part of its risk-transfer structure and framework. These include procedures for implementing, monitoring and reacting to the outcomes of rigorous, forward-looking stress and scenario testing, suited to identify possible events or cyclical changes in environmental conditions that could adversely impact a risk-transfer system's operation, liability or allocated resources.

In summary, many automated systems acting on or interacting with catastrophic events (CAT) need a clocked or otherwise triggered or driven frequency generator and/or frequency-based core engine. Such devices or modules are the technical core of automated signaling, handling or operating of a broad range of systems and devices for directly responding to the occurrence of or the risk of the occurrence of CAT events. Catastrophic (CAT) events include events such as natural disasters (e.g., earthquakes, floods, storms, hurricanes and tsunamis) and man-made disasters (e.g., terrorist attacks). These events are typically low-probability, high-cost events. Thus, units and individuals exposed to CAT event risks try to protect themselves by seeking an appropriate risk-transfer.

Further, these events are characterized by having a low probability of occurring, i.e. a low statistical probability, associated with a high fluctuation range, and they are difficult to capture with technical means. The same is true for automated systems that are activated or triggered by the occurrence of CAT events, as e.g. automatically operated risk-transfer systems. Such automated systems have additional technical burdens to be overcome, since an enormous amount of risk-exposed units are normally affected by a single CAT event. Thus, when a CAT event occurs, these systems must typically handle a large influx of losses that the systems must cover automatically, i.e. so called claims. Since risk-transfer systems are used to mitigate risk, in CAT-cases, automated pricing or even the availability of risk transfers must depend on measurable and thus parameterizable risk parameters that are associated with what is being ceded or transferred. Apart from the operational problems that must be overcome, efficiency in dealing with the consequences of disasters and losses, in particular any related claims, involves a variety of additional technical issues and concerns for automated risk-transfer systems. For example, we should be able to mitigate the consequences of a catastrophic event and/or settle any related claims in a timely manner to protect customer relations and for retaining customers. In addition, risk-transfer also systems often try to avoid negative publicity related to unresponsiveness or belatedness in settling losses and paying valid claims. In some extreme cases, lack of responsiveness in mitigating the consequences of a catastrophic event and in the proper processing of claims could lead to investigations by state insurance boards or even criminal probes. On the other hand, insurance risk-transfer systems should not settle fraudulent claims in the interest of a speedy resolution; plus, they have to manage the costs associated with settling these claims (e.g., personnel costs incurred in settling such claims).

In the prior art systems, "risk" is often implemented as a combination of predicted frequency and severity, where "frequency" predicts the probability that a loss will occur within a given time frame, and "severity" predicts the cost of such a loss associated with that particular event. In many risk-transfer systems, "severity" is calculated by dividing loss for a given time frame by the number of claims within that same time frame. Breaking risk down into different components and assessing these components appropriately can facilitate better risk operation and help improve the automated prediction of risk for a given situation. A better risk assessment and measurement leads to better risk correlations and better handling of consequences and costs, which can minimize instances of mistakenly overcharging or undercharging for a specific risk-transfer. This can result in better or more predictable operations of automated risk-transfer systems, and ultimately more appropriate rates for risk-exposed units and individuals. Risk-transfer systems typically analyze historical CAT, loss and premium data in efforts of generating statistical models that predict risk based primarily or entirely on such predictions. These models are used to assess expected risk. This assessment can then be used by a risk-transfer system to determine if a risk transfer should be performed, and, if such a transfer is performed, what rate should be charged to balance that risk transfer. However, different risk-transfer systems may use different structures as to which traditional risk-transfer factors (or data) have the greatest impact (or largest predictive value) on their associated risk-transfer units, which is why a multitude of models are in use across different risk-transfer systems.

For many years, any natural catastrophic (NAT CAT) assessment and modelling framework of risk-transfer systems has been based on so-called event sets. An event set consists of a probabilistic set of events for every hazard (hazard set), where each event is matched with an occurrence frequency. When rating an assembly, compilation or portfolio of transferred risks, prior art systems used Nat Cat rating engines for assigning a loss to each of the events using vulnerability curves. Events, their frequencies and respective losses are finally summarized in what is called an Event Loss Set (ELS). Such Event Loss Sets serve as a basis for constructing the exposure curves, which in turn are used for generating the technical pricing of a (re-)insurance contract. While the use of exposure curves in the exposure generated for standard covers is transparent and very efficient, this approach reveals limitations, when it comes to modelling complicated risk-transfer ((re-)insurance) structures. As such non-standard covers have gained importance in the recent past, there exists a growing need for complementing current technical prediction and modelling frameworks and extending technical structures to address the new requirements.

SUMMARY OF THE INVENTION

It is one object of the present invention to provide an automated system for measuring, predicting and exposure-signaling for associated automated risk-transfer systems driven by low frequency operational or catastrophic risk events, which does not suffer from the disadvantages of the prior art systems, as discussed above. The output signaling should allow for providing automated risk-transfer systems in order to optimize resource-pooling (capitalization) at such a level that it is possible to withstand the impact of the occurrence of a combination of extreme, but not inconceivable adverse events. The systems should be able to pass comprehensive stress and scenario testing procedures in terms of monitoring the pooled resource adequacy in adverse scenarios as part of its risk-transfer structure and framework. In particular, the proposed system should not exhibit the technical disadvantages of event loss sets (ELS) based on prior art systems using the ELS as a basis for the construction of exposure curves, which in turn are used to generate appropriate output signaling from automated generation of risk-transfer or pricing parameters, i.e. the present invention should also allow for automatically handling non-standard covers or risk-transfer within complex risk-transfer and multiple risk-transfer structures. As such, non-standard covers have gained importance in the recent past; the need has grown to complement current technical structures and frameworks and extending them to address the new requirements. Finally, the inventive technical structure should allow for automated capturing of peril-specific temporal clustering, as well as for the accurate reflection of intra-year occurrence patterns.

According to the present invention, these objects are achieved, particularly, with the features of the independent claims. In addition, further advantageous embodiments can be derived from the dependent claims and the related descriptions.

According to the present invention, the above-mentioned objects for an automated, inter-arrival-time-based system for automated prediction and exposure signaling of associated, catastrophic risk-event driven or triggered risk-transfer systems for low frequency occurring catastrophic or operational risk events, are achieved, particularly, in that, by means of the present invention, any occurring risk events are measured and assigned to a historic hazard set comprising event parameters for each assigned risk event; and risk-exposed units or individuals and/or the automated risk-transfer systems are provided with the corresponding risk-transfer parameters for an automated risk transfer and/or automated risk-event cover via signal transfer of a central, core circuit, and wherein an event loss set is generated by means of the system based on the measured frequencies with associated losses of said risk events of the hazard set, each of said risk events creating a set specific loss, in that a period loss set is assembled recording event losses of the event loss set assigned to generated time stamps, wherein the period loss set provides a corresponding time-based log record of the measured events of the event loss set, wherein the time stamps comprising a sequence of encode time data are generated and allocated to each event of the event loss set, and wherein a specific time stamp identifies an occurrence as point in time at which a specific event is measured, in that the time stamps are structured using an automatically and/or dynamically estimated or predefined distribution of corresponding generated inter-arrival times parameters, wherein an inter-arrival times parameter captures a waiting time between consecutive events of the period loss set, and wherein the waiting times measure the time intervals between two successive, measured occurrences of risk events, the occurrence of risk events being trackable over time by means of the time intervals, and in that the corresponding risk-transfer parameters for the signal transfer are assessed and generated by the central, core circuit based on said period loss set comprising the time-stamp parameters and losses for a specific time frame. Said distribution does not need to be pre-defined or pre-given but is, as a preferred embodiment variant, estimated by means of the system in the sense that it is the best fitting distribution to the set of data. There is some theoretical evidence favoring the Generalized Pareto, as is indeed supported by the data; however, other distributions may be applied by the system as well. Said estimated or predefined distribution can, e.g., at least comprise peril-specific temporal clustering and seasonal occurrence patterns. Said estimated or predefined distribution can, e.g., further be structured based on relevant time scale factors at least comprising El Nino/Southern Oscillation (ENSO) and/or Atlantic Multidecadal Oscillation (AMO) and/or North Atlantic Oscillation (NAO) and/or global warming return period gradients. The impact of external global large time scale drivers can e.g. be taken into account implicitly by the system by using the observed history for the calibration of the timestamps for atmospheric perils. Said estimated or predefined distribution can, e.g., further be structured by dynamically assigning and measuring leading risk indicators for a dynamic adaption of the occurrence risk. The automated, inter-arrival-time-based system can, e.g., be independently applied to individual natural hazards. Further, temporal correlations between perils can, e.g., be captured automatically through a seasonality dependent distribution structure, if both perils are subject to the related seasonality pattern. The present invention is focused on providing an automated, technical, real-time operational solution for capturing and transferring the risk of complex hazard-driven schemes and automations, especially related to highly complex, natural CAT occurrence structures and risk-transfer schemes. Apart from allowing machine-based interactions, measurements, assessments and predictions involving complex natural large-scale phenomena as CAT events, an automated risk-transfer and risk-transfer parameter generation is one of the key features of the invention. Therefore, one of the advantages of the present system envisions providing a fully automated risk-transfer system, in particular in the field of connected platforms related to CAT risks. More particularly, it has the technical capability to allow for providing a fully automated risk-transfer system giving the technical structure and scheme for automated and dynamic adaptable risk-transfer in real-time, thereby capturing complex occurrence structures, clustering and large time scale drivers. Further, the system has the advantage that it allows for providing a technical and comprehensive solution that facilitates evaluating and scoring risk-exposed units or individuals based on physically measured data. The invention makes it possible to provide an automated risk-transfer platform (that allows almost fully automated risk transfer, incl. an automated drawing up of risk-transfer parameters and policy issuing, where the risk transfer is stable over the long-time operation of the systems, claims handling, disaster prevention and prediction, etc.). The provider of the second risk-transfer system, i.e. the reinsurer or an independent third provider can act as a distributor of the risk-transfers (insurances) through appropriately interconnected applications, in particular mobile (smart phone) applications or embedded devices of risk-transfer or prediction systems. First and second risk-transfer systems are able to analyze the measured data from the hazard event set, individual data from the risk exposed units or individuals and the risk-transfer parameter signal form the system and central, core circuit, respectively, in order to provide a scoring for a specific risk-exposed unit or first risk-transfer system. Such data could also then be transferred to associated first insurance systems, which can give a quote based on the risk-transfer parameter signal or the score obtained. Thus, also the second risk-transfer system is able to optimize its operational risk-transfer parameters. Related to the advantages of the inventive system, the inter-arrival time (IAT) structure and method of the system is the backbone of the Period Loss Set (PLS) approach, which has been proven to be a powerful tool for assessing, measuring, predicting, pricing and otherwise steering automated systems, in particular automated risk-transfer systems. As seen clearly from these claimed features, a Period Loss Set (PLS) can be regarded as an extension of an Event Loss Set. In a PLS each event is assigned to a point in time (time stamp) rather than matched with an occurrence frequency. A Period Loss Set therefore just a time series of losses. This loss sequence is then applied to an assembly or portfolio of risk-exposed units resulting in annual expected losses. The resulting risk-transfer parameters can also be used as a basis for the consecutive generation of payment transfer parameters (e.g., prices), capacities, cost of capital and others. This conceptual structure is very easy to grasp. In addition, with the PLS-based system, the pricing of complicated contract structures is rendered very transparent for possible underwriters. Thus, for possible risk-transfer applications, the system allows for (i) transparent and consistent pricing over portfolios and perilsl, (ii) capacity parameter generation, (iii) capital cost calculation and monitoring, (iv) shortfall prediction and survey, (v) automated pricing of complex non-standard risk-transfer schemes and appropriate contracts (SRIS). The technical advantages of the present invention in contrast to the prior art systems are such that the present invention sets completely novel standards in the field of parametric TC cat-in-the-box risk-transfers (seasonality, aggregate limits). Further, the Inter-Arrival Times structure provides the backbone for the PLS, which is the construction of time stamps. This is done by means of the described technical approach based on the distribution of waiting times between consecutive events. These time periods are called inter-arrival times (IAT). Time stamps are automatically constructed in a way that generated IATs are equal the observed IATs in distribution (cf. FIG. 9). The present inventive IAT structure of the system is a unique technical framework throughout the industry. It explicitly introduces the dimension of time into an exposure assessment of a Nat Cat exposure assembly or portfolio. The IAT structure rests on a solid scientific foundation in risk-assessment engineering, natural sciences and mathematics. It is designed to technically cover, on the on hand, peril specific temporal clustering and, on the other hand, seasonal occurrence patterns. The inventive system, moreover, explicitly allows for incorporating other influencing factors such as El Nino/Southern Oscillation (ENSO) and/or Atlantic Multidecadal Oscillation (AMO) and/or North Atlantic Oscillation (NAO) and/or global warming return period gradients or other large scale drivers.

As an embodiment variant, the estimated or predefined distribution can, e.g., be structured by means of a generalized Pareto distribution (GPD), the GPD distributed IATs fitting the measured or empirical historic hazard set. The GPD arises naturally if events are Poisson distributed with a Gamma distributed random scale parameter $\lambda$. The distribution of $\lambda$ around its mean is set by the externally induced fluctuations of this scale parameter $\lambda$. The operational setting of the scale parameter $\lambda$ can, e.g., comprise at least the technical boundary conditions; i) the scale parameter $\lambda$ lies within a positive value range, and ii) the scale parameter $\lambda$. takes a unique most probable value, wherein, by means of conditions i) and ii), said estimated or predefined distribution is set to a unimodal distribution with non-negative support for the random scale parameter $\lambda$. For the setting of the time stamps, the physically relevant parameter space for the estimated or predefined distribution as generalized Pareto distribution can, e.g., comprise the technical boundary conditions of (i) a non-negative lower threshold $\mu$ of the inter-arrival times, (ii) a positive scale parameter $\sigma$, (iii) the mean inter-arrival time exists with a shape parameter fulfilling $0 < \xi < 1$, and (iv) is truncated to inter-arrival times less than T.

In a further embodiment variant, the automated, inter-arrival-time-based system comprises one or more first risk-transfer systems to provide a first risk transfer based on said first, generated risk-transfer parameters from at least some of risk-exposed units to one of the first risk-transfer systems, wherein the first risk-transfer systems comprise a plurality of payment transfer modules configured to receive and store first payment parameters associated with the risk transfer of risk exposures of said risk-exposed units for pooling of their risks, and wherein an occurred and a triggered loss of a risk-exposed unit is automatically covered by the first risk-transfer system based on the first risk-transfer parameters and correlated first payment-transfer parameters. The automated, inter-arrival-time-based system can also comprise a second risk-transfer system to provide a second risk transfer based on generated second risk-transfer parameters from one or more of the first risk-transfer systems to the second risk-transfer system, wherein the second risk-transfer system comprises second payment-transfer modules configured to receive and store second payment parameters for pooling the risks of the first risk-transfer systems associated with risk exposures transferred to the first risk-transfer systems, and wherein an occurred and a triggered loss are automatically covered at least partially by the second risk-transfer system based on the second risk-transfer parameters and correlated second payment-transfer parameters. This alternative embodiment has, inter alia, the advantage that it allows for providing an optimized multi-tier risk-transfer system adapted for real time. Further, it allows for capturing and/or controlling the relevant risk drivers, and for comparing their behavior within the technical operation and context of the automated system. It is possible to automatically capture and score risks according to location and type of the risk-exposed unit, and to automatically analyze and respond to data related to the need for added services, such as risk notifications, risk-reducing improvements, etc.). Thus, the present invention further allows for an automated optimization of first and second risk-transfer systems by offering the risk-transfer parameters of the present invention as aggregation signaling.

In one alternative embodiment, the system comprises means for processing risk-related component data of the risk-exposed units and for providing information regarding the likelihood of said risk exposure to become realized for one or a plurality of the pooled risk-exposed units or individuals, in particular, based on data concerning risk-related units or individuals, and wherein the receipt and preconditioned storage of payments from the first resource pooling system to the second resource pooling system for the transfer of its risk can be determined dynamically, based on the total risk and/or the likelihood of risk exposure of the pooled risk-exposure components. This alternative embodiment has, inter alia, the advantage that the operation of the first and/or second resource pooling system can be dynamically adjusted to the changing conditions of the pooled risk, such as changes in the environmental conditions or risk distribution, or the like, of the pooled risk components. A further advantage is the fact that the system does not require any manual adjustments, if it is operated in different environments, places or countries, because the size of the payments of the risk-exposure components is directly related to the total pooled risk.

In one alternative embodiment, the number of pooled risk-exposed units and/or individuals is dynamically adjusted via the first risk-transfer system to a range where non-covariant, occurring risks that are covered by the risk-transfer system affect only a relatively small proportion of the total pooled risk-exposure components at any given time. Analogously, the second risk-transfer system can, for example, dynamically adjust the number of pooled risk shares transferred from first risk-transfer systems to a range, where non-covariant, occurring risks that are covered by the second risk-transfer system affect only a relatively small proportion of the total pooled risk transfers from first risk-transfer systems at any given time. This variant has, inter alia, the advantage that it allows for improving the operational and financial stability of the system.

In one alternative embodiment, the risk event triggers are dynamically adjusted by means of an operating module based on time-correlated incidence data relative to one or a plurality of the predefined risk events. This alternative embodiment has, inter alia, the advantage that it allows for improving the capture of risk events or for avoiding the occurrence of such events altogether, for example, by improved forecasting systems, etc., to dynamically capture such events by means of the system and dynamically affecting the overall operation of the system based on the total risk of the pooled risk-exposure components.

In another alternative embodiment, upon each triggering of an occurrence, where parameters indicating a predefined risk event are measured by means of at least one risk event trigger, a total parametric payment is allocated with the triggering, and wherein the total allocated payment is transferrable upon a triggering of the occurrence. The predefined total payments can, for example, be leveled to any appropriate, defined total sum, such as a predefined value, or any other sum related to the total transferred risk and the amount of the periodic payments of the risk-exposed motor vehicle. This alternative has, inter alia, the advantage that, for the parametric payments or the payments of predefined amounts, the user can rely on fixed amounts. Further, the parametric payment may allow for an adjusted payment of the total sum that can, for example, depend on the stage of the occurrence of a risk event, as triggered by the system.

BRIEF DESCRIPTION OF THE DRAWINGS

The present invention will be explained in more detail below relying on examples and with reference to these drawings in which.

DETAILED DESCRIPTION OF THE PREFERRED EMBODIMENTS

Figure 1:
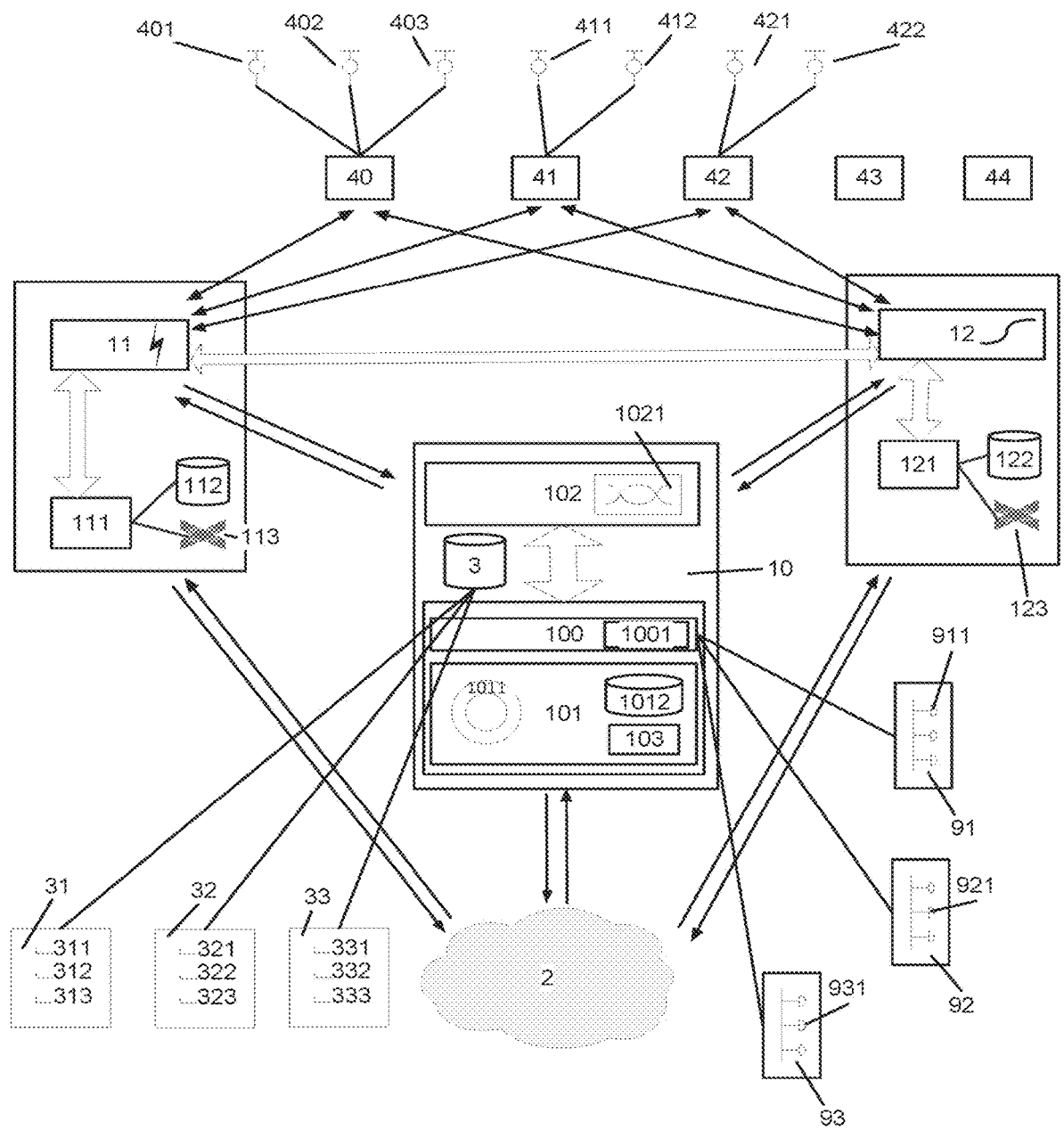
FIG. 1 shows a block diagram, schematically illustrating an automated, inter-arrival-time-based system 1 for the automated prediction and exposure-signaling of associated, catastrophic risk-event-driven or -triggered risk-transfer systems 11/12, in particular for low frequency catastrophic or operational risk events 311, . . . , 313 with a complex occurrence structure. However, system 1 is also applicable to other occurrence structures, for example high statistic events having, for example, an occurrence rate with a complex clustering structure. Occurring risk-events 311, . . . , 313 are measured by means of the measuring stations or sensors 401, 402, . . . , 411, 412 in loco. The measured sensory data of the measuring devices 401, 402, . . . , 411, 412 are transmitted via an appropriate data transmission network to a central core circuit 10 and assigned to a historic hazard set 31 comprising event parameters for each assigned risk event. The risk-exposed units or individuals 40, 41, 42, . . . and/or the automated risk-transfer systems 11/12 or other risk-event-driven or -triggered systems, such as automated alarm systems or exposure-improved, automated expert systems, and the like, are provided with the corresponding risk-transfer parameters or risk-exposure and/or occurrence-prediction parameters. For an automated risk transfer and/or automated risk-event cover, a signal is automatically generated and transferred from the central, core circuit 10.

FIG. 1 schematically illustrates an architecture for a possible implementation of an embodiment of the automated, inter-arrival-time-based system 1 for automated prediction and exposure signaling of associated, catastrophic risk-event-driven or -triggered systems; in particular, automated risk-transfer 11/12 transferring risks of catastrophic or operational risk events 311, . . . , 313 with a complex, low frequency structure. However, system 1 is also applicable to other occurrence structures, for example high statistic events that have, however, an occurrence rate with a complex clustering structure. Occurring risk-events 311, . . . , 313 are measured by means of measuring stations or sensors 90, 91, 92, . . . and/or 401, 402, . . . , 411, 412 in loco and/or by satellite image processing. The measured sensory data 911, 912, 913, ... of the measuring devices 90, 91, 92, ... /401, 402, ..., 411, 412 are transmitted via an appropriate data transmission network 2 to a central core circuit 10 and assigned to a historic hazard set 31 comprising event parameters for each assigned risk-event. To capture and measure the appropriate measured sensory data 911, 912, 913, ... the central core circuit 10 comprises a risk-event driven core aggregator 100 with measuring data-driven triggers 1001 for triggering, capturing, and monitoring in the data flow pathway 921, 922, 923, ... /421, ..., 425 of the sensors 90, 91, 92, ... /401, ..., 405 and/or measuring devices 411, ..., 415 of the risk-exposed units or individuals 41, ..., 45 The sensors 911, 912, 913, ... /401, ..., 405 and/or measuring devices 911, 912, 913, ... /411, ..., 415 can, e.g., comprise at least seismometers or seismographs for measuring any ground motion, including seismic waves generated by earthquakes, volcanic eruptions, and other seismic sources, stream gauges in key locations across a specified region, measuring during times of flooding how high the water has risen above the gauges to determine flood levels, measuring devices for establishing wind strength, e.g. according to the Saffir-Simpson Scale, sensors for barometric pressure measurements and/or ocean temperature measurements, in particular the temperatures of ocean surface waters and thereby determining the direction a hurricane will travel and a potential hurricane's intensity (e.g., by means of floating buoys to determine the water temperature and radio transmissions back to a central system), and/or satellite image measurements estimating hurricane strength by comparing the images with physical characteristics of the hurricane. The central core circuit 10 further comprises a trigger-driven score module 104 measuring and/or generating a single or a compound set of variable scoring parameters 311, ..., 313 of a hazard, i.e. measuring parameters of an occurring hazard risk-event profiling the occurrence and/or style and/or environmental condition of a hazard based upon the triggered, captured, and monitored measuring parameters or environmental parameters.

The risk-exposed units or individuals 40, 41, 42, ... and/or the automated risk-transfer systems 11/12 or other risk-event-driven or -triggered systems, such as automated alarm systems or exposure-improving automated expert-systems, and the like, are provided with corresponding risk-transfer parameters or risk-exposure and/or occurrence-prediction parameters. For automated risk-transfer and/or automated risk-event cover, a signal is automatically generated and transferred from the central core circuit 10 to the risk-exposed units and/or individuals 40, 41, 42, ... and/or the automated risk-transfer systems 11/12. By means of the system 1, an event loss set 32 is generated based on the measured frequencies with associated losses 321, ..., 323 of said risk events 311, ..., 313 of the hazard set 31, wherein each of said risk events 311, ..., 313 creates a set specific loss 321, ..., 323.

A period loss set 33 is assembled recording event losses 321, ..., 323 associated with the risk events 311, ..., 313 of the event loss set (ELS) 32 assigned to generated time stamps 331, ..., 333. The period loss set (PLS) 33 provides a corresponding time-based log record of the measured and/or probabilistically modelled events of the event loss set (ELS) 32, wherein the time stamps 331, ..., 333, comprising a sequence of encoded time data, are generated and allocated to each event 321, ..., 323 of the event loss set (ELS) 32, and wherein a specific time stamp 331, ..., 333 identifies an occurrence as a point in time when a specific event is measured.

The time stamps 331, ..., 333 are structured using an automatically and/or dynamically estimated or predefined distribution 1011 of correspondingly generated inter-arrival times parameters (IAT). Said distribution 1011 does not need to be pre-defined or pre-given but is, as one preferred embodiment variant, automatically estimated by means of the system in the sense that it is the best fitting distribution for the set of data. There is some theoretical evidence favoring the Generalized Pareto distribution, as is indeed shown in the data; however, other distributions 1011 may be estimated, selected and/or applied by the system 1 as well. An inter-arrival times parameter (IAT) captures a waiting time between consecutive events 311, ..., 313 of the assembled period loss set (PLS) 33. The waiting times (IAT) measure the time intervals between two successive measured occurrences of risk-events 311, ..., 313, the occurrence of risk-events 311, ..., 313 being trackable over time by means of the time intervals. The estimated or predefined distribution 1011 can at least comprise peril-specific temporal clustering 1031 and/or seasonal occurrence patterns. Said estimated or predefined distribution 1011 can further be structured based on relevant time scale factors 1033 at least comprising El Nino/Southern Oscillation (ENSO) and/or Atlantic Multidecadal Oscillation (AMO) and/or North Atlantic Oscillation (NAO) and/or global warming return period gradients. The impact of external global large time scale drivers 1034 can, e.g., be taken into account implicitly by the system 1 by using the observed history for the calibration of the time stamps 331, ..., 333 for atmospheric perils. Said estimated or predefined distribution 1011 can, e.g., be further structured by dynamically assigning and measuring leading risk indicators for the dynamic adaption of the occurrence risk.

In the prior art, a negative binomial distribution structure is often used in the aggregation if the clustering of events needs to be taken into account. There is a connection between the generalized Pareto inter-arrival times and negative binomial distributions in a sense that the negative binomial distribution is obtained by mixing a Poisson distribution with a Gamma distribution, i.e. if $n\sim\text{Poi}(\lambda)|\lambda\sim\Gamma(\alpha,\beta)$ then $n\sim\text{NB}(r,p)$, with $r=\alpha$ and $p=1/(\beta+1)$. In the domain of a count structure, the construction and application of a negative binomial distribution is thus the same as the construction of the generalized Poisson distribution in the inter-arrival time domain. It has to be pointed out, however, that the count structure of inter-arrival times distributed according to the GPD does not correspond to a negative binomial distribution. This essentially can be traced back to the fact that the memory is carried over the years for generalized Pareto distributed inter-arrival times while it is lost at the beginning of every new year in the negative binomial case. This shows up in the fact that there is a significantly higher probability for periods without any arrival.

Depending on the application of the system 1, it can also be favorable that the automated, inter-arrival-time-based system 1 is independently applied to individual natural hazards. Temporal correlations between perils can be captured automatically by means of the system through a seasonality-dependent distribution structure, if both perils are subject to the related seasonality pattern. It is to be noted that, during the last years, the proportion of systems and technical solutions with temporal risk-transfer conditions from non-straight-forward covers, such as 2-nd event covers, multi-year and seasonal covers, has increased significantly. For pricing as well as for capacity management, it is therefore important to explicitly consider the time dimension. However, with prior art systems, up-to-now, it has technically not been possible to automated capture seasonal occurrence patterns. The time stamps 331, ..., 333 structure of the system 1 technically allows for probabilistically capturing and predicting the arrival times of events in such a way that the set 33 of time stamps 331, ..., 333 is identical with observed and physically measured data, in distribution 1011. The structure is based on inter-arrival times (IAT), i.e. the time periods between successive event times 331, ..., 333. The present technical solution and system 1 provide a solid engineering and scientific foundation in natural sciences, as well as in mathematics. One of the focus areas of the present inventive system lies in measuring, predicting, capturing and modelling the arrival times of natural catastrophes. The usage of system 1 is not restricted to natural catastrophic (NatCat) events. It is designed to cover both: peril specific temporal clustering and seasonal occurrence patterns. The technical structure of the system also allows for incorporating other influencing factors, such as the above mentioned AMO, ENSO, explicitly.

Figure 2:
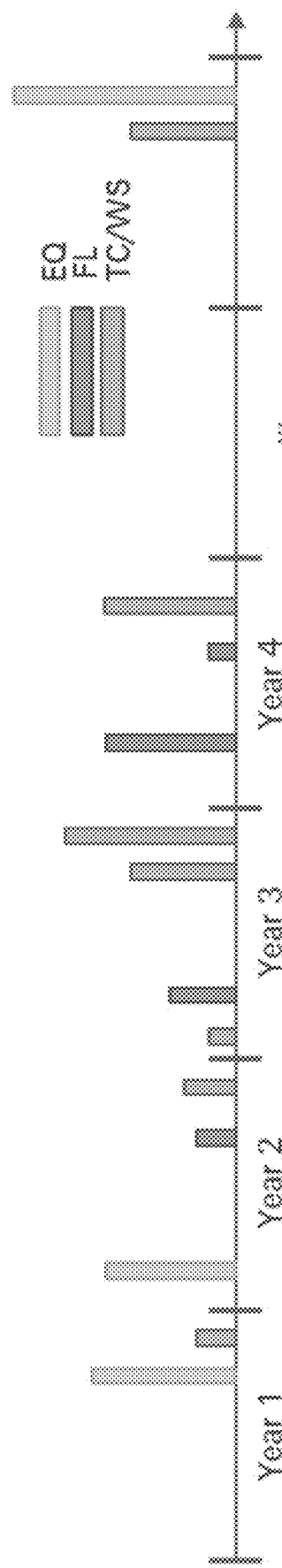
FIG. 2 shows a block diagram schematically illustrating an exemplary Period Loss Set (PLS) 33 involving three types of perils, EQ: earthquake, FL: flood, and TC/WS: tropical cyclone/windstorm.

With regard to the prior art systems, the fact that, for many years, the technical framework for NatCat in automated prior art systems was based on so-called Event Sets must be stressed again. In this context, an Event Set consists of a probabilistic set of events for every hazard (hazard set), where each event is provided with an occurrence frequency. When assessing or rating an assembly or portfolio of risk-exposed units or individuals 41, ..., 45, these systems, for example, assign a loss to each of the events with the help of vulnerability curves. Events, their frequencies and respective losses are finally summarized in what is called an Event Loss Set (ELS) 32. Such Event Loss Sets 32 serve as a basis for the construction of the exposure curves, which, in turn, are used for the generation of the technical risk-transfer and payment-transfer (pricing) parameters of a respective risk-transfer ((re-)insurance) system. While the use of exposure curves in the exposure calculation for standard covers is transparent and very efficient, this prior art approach has limitations, when it comes to capturing or generating complicated risk-transfer structures. As such non-standard covers have gained in importance in recent years, so has the need for complementing the current technical framework and extending it in view of new technical requirements. For this purpose, and to overcome these limitations, the present invention provides the present, new probabilistic structure for automated exposure measuring, prediction and modelling, which is called the Period Loss Set (PLS) 33. A Period Loss Set (PLS) 33 is an extension of an Event Loss Set (ELS) 32. Its construction proceeds in essentially three steps: (1) starting from the hazard set, each event in it creates a portfolio-specific loss. From the corresponding ELS 32, the loss frequency curve can be constructed. The next step introduces time explicitly; (2) the time points (time stamps) at which events happen are modelled by the invention-specific inter-arrival time (IAT) structure. This structure is described in detail below. The most important technical "constraint" for the generated time-stamps 331, ..., 333 is that predicted or modelled inter-arrival times (IAT) must equal observed inter-arrival times (IAT) in distribution 1011; (3) Once the time stamps 331, ..., 333 have been set, a loss from the ELS 32 is allocated to each one. For this, see FIG. 2 showing a block diagram, schematically illustrating an exemplary Period Loss Set (PLS) 33 involving three types of perils, EQ: earthquake, FL: flood, and TC/WS: tropical cyclone/windstorm.

First and/or second risk-transfer parameters and/or first and/or second payment-transfer parameters (1121, ..., 1125/1221, ..., 1225) can then be generated on the PLS 33 for the relevant time period (for example, one year), yielding an accurate loss prediction or estimate even for complicated aggregate risk-transfer ((re)insurance) structures. The length of the predicted period is needed to render stable metrics and operational conditions, such as annual expected loss and expected shortfall. The backbone of the technical approach by means of the PLS 33 structure is the construction of time stamps 331, ..., 333. Building the PLS 33 on time stamps 331, ..., 333 introduces explicitly the dimension of time into exposure measuring, predicting and modelling. In the approaches as set forth by the prior art, which are based on exposure curves, the time dimension only comes into play through the frequency model in the aggregation. In contrast, the time stamps 331, ..., 333 allow for both, the representation of peril-specific temporal clustering as well as for the accurate reflection of intra-year occurrence patterns. This is possible because the invention probabilistically models the time dimension for each peril. The time stamp 331, ..., 333 structure applies independently to individual natural hazards. Temporal correlations between perils arise naturally through seasonality if both perils are subject to the related seasonality pattern. In one embodiment variant setting, the impact of external global large time scale drivers, such as AMO and ENSO, is not explicitly captured. It has to be pointed out, however, that these drivers are taken into account implicitly by using the observed history for the calibration of the time stamps 331, ..., 333 for atmospheric perils. Due to its broad applicability, PLS 33 allows for equal treatment of different perils leading to consistent risk transfer and pricing of the entire Nat Cat assembly or portfolio. It therefore guarantees consistency of risk-transfer parameters, payment-transfer parameters (pricing) as well as of annual aggregation. The current setting moreover serves as a basis for future extensions or requirements, such as, e.g., the inclusion of earthquake aftershocks, explicit ENSO modelling, or temporal inter-peril correlation.

The estimated or predefined distribution 1011, as discussed above, can preferably be structured by means of a generalized Pareto distribution (GPD), the GPD distributed IATs fitting the measured or empirical historic hazard set 31. The GPD arises naturally in the case when events are Poisson distributed with a Gamma 10112 distributed random scale parameter $\lambda$. The distribution 1011 of $\lambda$ around its mean is set by the externally induced fluctuations of this scale parameter $\lambda$. The operational setting of the scale parameter $\lambda$ can, e.g., comprise at least the technical boundary conditions i) the scale parameter $\lambda$ does lie within a positive value range, and ii) the scale parameter $\lambda$ takes a unique most probable value, wherein, by means of condition i and ii, said estimated or predefined distribution is set to a unimodal distribution with non-negative support for the random scale parameter $\lambda$. For the setting of the time stamps 331, ..., 333, the physically relevant parameter space for the estimated or predefined distribution as generalized Pareto distribution can, e.g., comprise the technical boundary conditions of (i) a non-negative lower threshold $\mu$ of the inter-arrival times, (ii) a positive scale parameter $\sigma$, (iii) the mean inter-arrival time exists with a shape parameter fulfilling $0<\xi<1$, and (iv) is truncated to inter-arrival times less than T.

The corresponding risk-transfer parameters for the signal transfer are assessed and generated by the central, core circuit 10 based on said period loss set 33 comprising the time-stamps parameters 331, ..., 333 and losses 321, ..., 323 for a specific time frame.

The background of the Inter-Arrival Time (IAT) distribution and the inventive technical structure is characterized by an idealized stochastic structure for events that occur randomly in time at a particular location, which is a renewal process. The corresponding temporal events are generically referred to as "arrivals." Time intervals between successive arrivals are called inter-arrival times (IAT). The basic assumption is that the inter-arrival times (IAT) are independently and identically distributed. The process borrows its basic properties from the distribution of inter-arrival times (IAT). The most common renewal process is a Poisson process. It is characterized by the fact that inter-arrival times are distributed according to an exponential distribution with scale parameter $\lambda$. where scale $A \in (0, \infty)$, support $x \in (0, \infty)$, the probability density function (pdf) is assumed to be $f(x) = \lambda e^{-\lambda x}$, and the cumulative distribution function (cdf) is assumed to be $F(x) = 1 - e^{-\lambda x}$. The mean IAT for a Poisson process with scale parameter $\lambda$ is $$\bar{\tau} := \mathbb{E}[\tau] = \frac{1}{\lambda}$$

The Poisson process is often chosen as an underlying structure, since it provides a series of properties that make processing easier.

In the present invention, inter-arrival times distributions 1011 of the class of the generalized Pareto distribution (GPD) are employed. The reasons for the choice of the GPD for the distribution 1011 of IATs are two-fold. First, empirical data show a very good agreement of observed data and GPD distributed IATs. Second, there is theoretical support for this choice, which will be outlined below. Some relevant properties and implications are also discussed that follow from the use of the GPD as estimated or predefined distributions 1011.

There are two main reasons for favoring the generalized Pareto distribution. One is mathematical, the other one physical. When assuming that an event is Poisson-distributed, i.e. that the number of arrivals is distributed according to a Poisson distribution, we agree on a fixed scale parameter $\lambda$, which might be regarded as a rate or inverse intensity: "This event is released with some fixed rate $\lambda$." But it might be that this parameter is affected by other factors or events, e.g. the release of an event is triggered by another event; physical conditions, such as temperature change and hence alter the release rate. Thus, considering an event source as an actually open system makes it reasonable to model the parameter $\lambda$ as a random variable. The distribution of A around its mean represents the externally induced fluctuations of this parameter.

Basic knowledge about $\lambda$ includes that (i) $\lambda$ is non-negative, while (ii) $\lambda$ has a unique most probable value. These conditions can be reflected by using a uni-modal distribution with non-negative support for the random variable $\lambda$. A distribution, which meets the requirements outlined above, is the Gamma distribution having a shape parameter $\alpha \geq 1$ and a scale parameter $\beta > 0$. If it is assumed that the basic process is a Poisson renewal process, whose scale parameter is random and distributed according to a Gamma distribution, then the inter-arrival times (IAT) $\tau$ are distributed according to a generalized Pareto distribution (GPD).

if $\tau \sim \text{Exp}(\lambda) | \Delta \sim \Gamma(\alpha, \beta)$ then $\tau \sim \text{GPD}(\xi, \sigma, \mu)$ with shape parameter $\xi = 1/\alpha$ and scale parameter $\alpha = \beta/\alpha$; the location parameter is zero, $\mu = 0$. In other words, the GPD arises as the mixture of an exponential and a gamma distribution. Since in the limit of vanishing $\xi$ the GPD becomes an exponential distribution, the GPD renewal process generalizes the Poisson process.

In the setting of time stamps 331, ..., 333 for probabilistic exposure modelling, the physically relevant parameter space for the generalized Pareto distribution is governed by the following conditions: For obvious reasons, the lower threshold of the inter-arrival times is zero, hence $\mu \geq 0$. Further, the condition on the Gamma function has been that it is required to have a unique most probable value. This implies that the mode of the function must exist, which is the case for $\alpha \geq 1$. If it is required that, in addition, the mean inter-arrival time exists, the shape parameter must fulfill $0 \leq \xi < 1$. The physically relevant parameter space for the GPD is therefore given by (i) Scale: $\alpha > 0$, (ii) Shape: $0 \leq \xi < 1$, (iii) Location: $\mu \geq 0$. The mean inter-arrival time for a GPD renewal process is set by:

$$\bar{\tau}_\xi := \mathbb{E}[\tau] = \mu + \frac{\bar{\tau}}{1-\xi}$$

The generation of the time stamps 331, ..., 333 needs to take into account a certain time resolution required for example for appropriate risk-transfer parameters or payment transfer parameters (pricing) purposes. This may for instance be a reporting threshold between two successive events which, in reality, can e.g. be set in the order of hours. While the lower threshold for the inter-arrival times is already contained in the generalized Pareto distribution, there might be demand for an upper limit of inter-arrival times as well. This may be for example the case in the context of in-house built structures and models. Therefore, for the inventive system, the distribution 1011 of IATs is technically truncated at some value truncation T, with T>$\mu$. The resulting truncated generalized Pareto distribution $\text{GPD}_T(\xi, \sigma, \mu, T)$ is the one which is used for the time stamp 331, ..., 333 structuring in the PLS 33.

To illustrate the parametrization of the truncated generalized Pareto distribution, the parametrization is intentionally restricted to the physically relevant parameter space, where the parameters are: location $\mu \in (0, \infty)$; scale $\sigma \in (0, \infty)$; shape $\xi \in (0, 1)$; truncation point $T \in (\mu; \infty)$; the support is $\mu \leq x \leq T$; the probability density function (PDF) being the density of a continuous random variable and giving the relative likelihood for this random variable to take on a given value, can be taken here as $$h_T(x) = \frac{1}{H(T)} \frac{1}{\sigma} \left(1 + \xi \frac{x-\mu}{\sigma}\right)^{-1/\xi - 1};$$

the cumulative distribution function (CDF) of the real-valued random variable X given at x being the probability that X will take a value less than or equal to x and giving the relative likelihood for this random variable to take on a given value, can be taken here as $$H_T(x) = 1 - \frac{1}{H(T)} \left(1 + \xi \frac{x-\mu}{\sigma}\right)^{-1/\xi};$$

and the Mean can be taken as $$\mathbb{E}[x] = \frac{1}{H(T)} \frac{\sigma}{1-\xi} \left[ 1 + \frac{\mu(1-\xi)}{\sigma} - (H(T)) \left( 1 + \frac{T-\sigma\mu}{\sigma} \right) \right] \text{ with}$$

$$H(T) = 1 - \left( 1 + \xi \frac{T-\mu}{\sigma} \right)^{-1/\xi}$$

Thus, it can be concluded $$\mathbb{E}[x] = \left( \mu - \frac{\sigma}{1-\xi} \right) \left[ \frac{\sigma^{1/\xi} \frac{c_T}{c_\mu} - C^{1/\xi}}{\sigma^{1/\xi} - C^{1/\xi}} \right] \text{ with}$$

$$tr(\xi, \sigma, \mu, T) = \left[ \frac{\sigma^{1/\xi} \frac{c_T}{c_\mu} C^{1/\xi}}{\sigma^{1/\xi} - C^{1/\xi}} \right]$$

and $C = \sigma + \xi(T - \mu) \geq \sigma$, $c_\mu = \sigma - \xi\mu + \mu$, $c_T = \sigma - \xi\mu + T > c_\mu$.

The truncation function tr(., T) is strictly increasing and concave, while tr(., T) ↗ 1 for →∞.

As mentioned, the resulting truncated generalized Pareto distribution $GPD_T$ (ξ, σ, μ, T) is the one which is used for the time stamp 331, . . . , 333 structuring in the PLS 33. This includes the mean inter-arrival time under truncation, i.e. $\bar{\tau}_{\xi,T}$. Truncation diminishes the mean-arrival time due to $$\bar{\tau}_{\xi,T} := \mathbb{E}[\tau] = \left( \mu + \frac{\bar{\tau}}{1-\xi} \right) \cdot tr(\xi, \sigma, \mu, T)$$

where tr(., T)<1 describes the effect of truncating the IAT-distribution distribution 1011.

Clustering, in the temporal and/or in the spatial domains, seems to be a ubiquitous phenomenon in nature. The physical reasons for clustering are numerous. Some trace back to complex dependencies within large scale complex systems. Historical data shows the existence of temporal clustering for various perils. For an accurate capturing of the time dimension for these natural hazards, it is therefore crucial to have a structuring framework in place that is able to accommodate temporal clustering.

Figure 3:
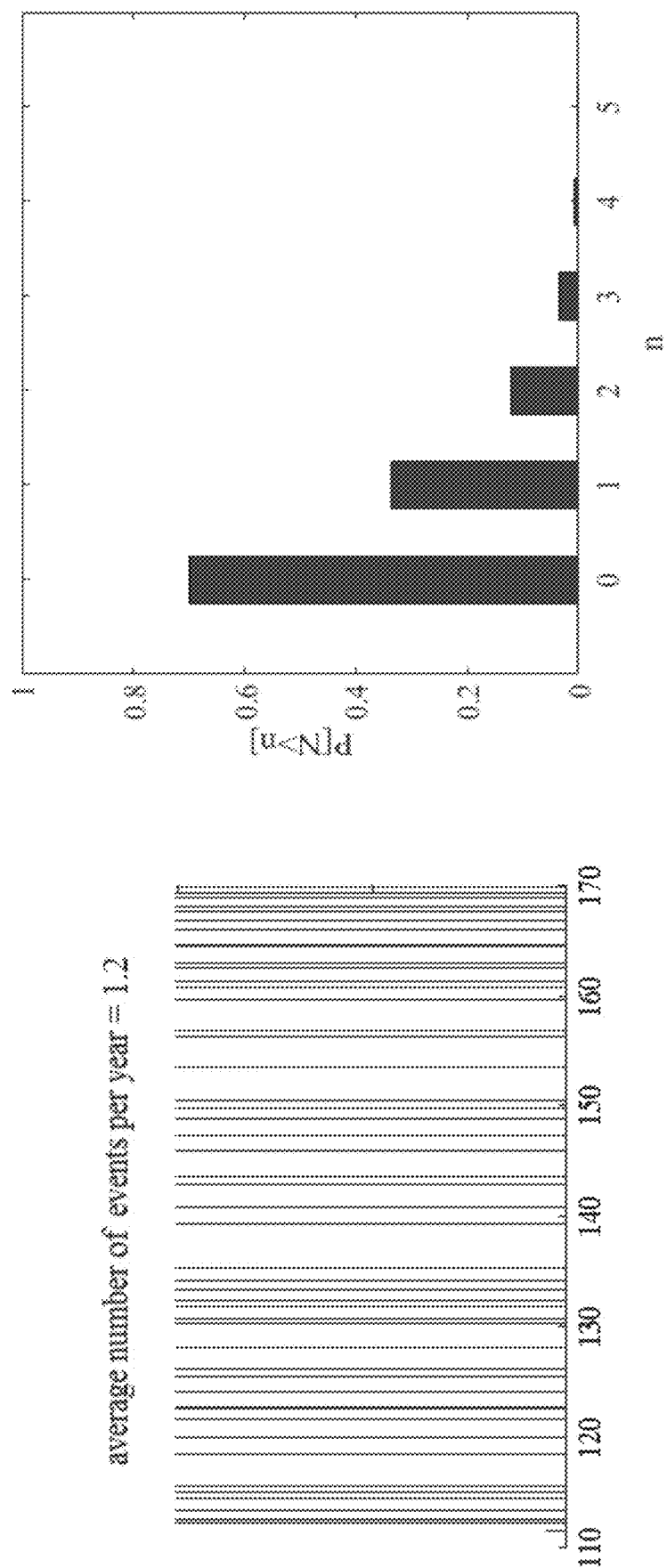
FIG. 3 shows a block diagram schematically illustrating: (A) Left: a typical Poisson arrival pattern. The parameters are chosen accordingly in such a manner that, on average, there are 1.2 events within one given year; (B) Right: number of events n (x-axis) vs the probability of more than n events occurring within one given year (y-axis). Note that there is a probability of about 2% that at least 3 events occur within one given year.

With regard to comparable automated prior art systems, it is important to note that there is no clustering in a Poisson process. In a Poisson process, occasional increases in frequency per time unit (so-called Poisson clumping or Poisson bursts) occur naturally, simply due to statistical fluctuations of the inter-arrival times. In fact, exactly these clumps account for the characteristic shape of the tail of a Poisson distribution. Consequently, there is a non-vanishing probability to find "clusters" of more than n events within any finite time interval. As an example, the probability could be calculated to find at least n events in the time interval which equals the mean arrival of the Poisson process. (I.e. in the mean, there is only one event in this interval.) FIG. 3 shows a block diagram schematically illustrating: (A) Left: a typical Poisson arrival pattern. Parameters are chosen, so that, in the mean, there are 1.2 events within one year; (B) Right: number of events n (x-axis) vs probability, where the occurrence of the total number n of events would be 1. Note that there is a probability of about 2% to find at least 3 events within one year.

If the estimated or predefined IAT distribution 1011 is a GPD, one has a simple measure for clustering, which is the shape parameter ξ governing the decay of the GPD. Here and in the following, it is assumed 0≤ξ<1. For ξ>0, the distribution is heavy tailed, while in the limit ξ→0, the GPD becomes an exponential distribution. Thus, ξ is a measure for the degree of clustering: If ξ=0, i.e. in the exponential case, the degree of clustering is zero.

Figure 4:
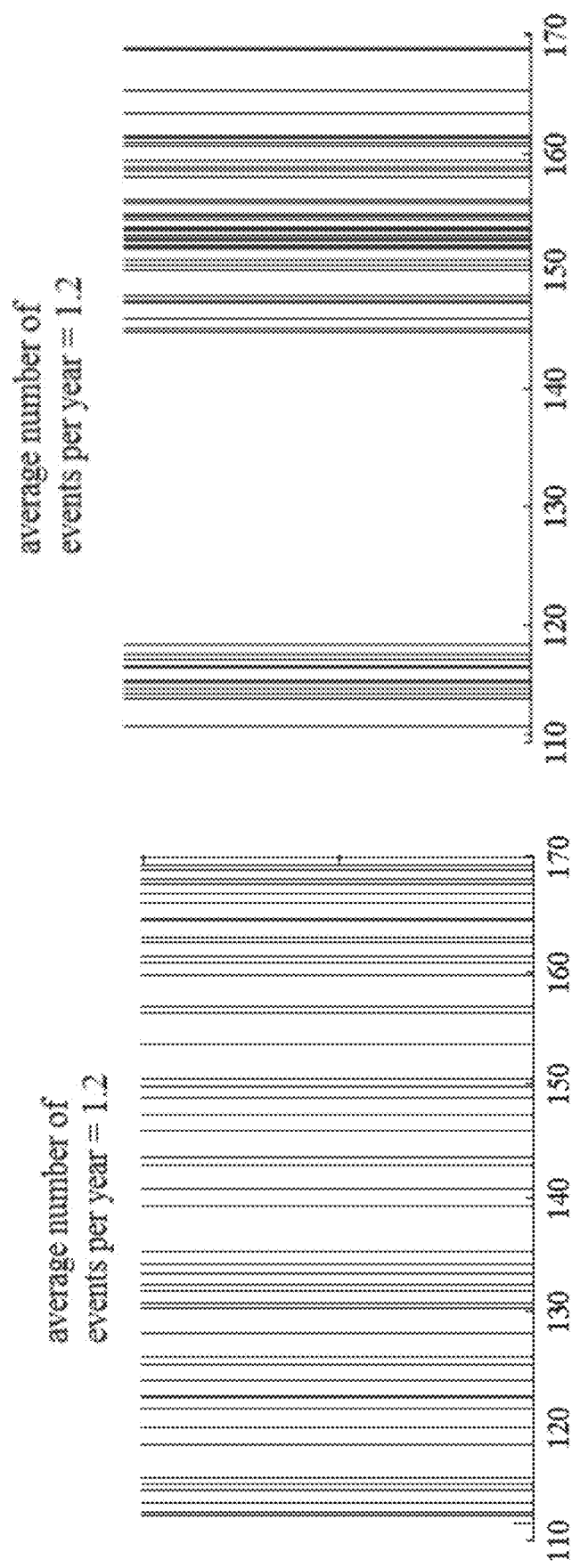
FIG. 4 shows another block diagram, schematically illustrating time stamps 331, . . . , 333 for events 311, . . . , 313 related to a renewal process with Generalized Pareto Distribution (GPD): (left)=0 Poisson process, (right) ξ=1/3. In both cases the average number of events per year is 1.2.

In the GPD structure, the degree of clustering is directly related to the uncertainty of the scale parameter λ. For the inventive system 1, the tail parameter ξ is related to the variance of the Gamma distribution as ξ=Var[λ/$\bar{\lambda}$]. This relation can be rephrased as: the larger the uncertainty of the Poisson (scale) parameter, the stronger the clustering. The parameter ξ only vanishes if the uncertainty of the Gamma distribution vanishes, which is the case if β→∞ for a fixed $\bar{\lambda}$. Therefore, a Poisson process arises in the limit of complete knowledge about the scale parameter λ. In other words: structuring the number of events using a Poisson process implicitly assumes that the user has complete knowledge about the Poisson parameter. FIG. 4 shows a block diagram schematically illustrating time stamps 331, . . . , 333 for events 311, . . . , 313 for a renewal processes with Generalized Pareto Distribution (GPD): (left) ξ=0 Poisson process, (right) ξ=1/3. In both cases the average number of events per year is 1.2.

Having defined ξ as the degree of clustering, to understand the inventive system 1, it is important to ask about the related memory. In a memory less process, as used by the prior art systems, such as the Poisson process, the time until the next event is independent of the time since the last event. For the more general case of a GPD distribution, as used in the inventive system 1, it is asked about the time when an event is expected to happen, given that some time has elapsed since the last event. For GPD inter-arrival times of the invention, this expected value takes:

$$\mathbb{E}[\tau \mid \tau > t] = \frac{\tau + t\xi}{1-\xi}, \quad 0 \leq \xi < 1$$

where setting μ=0 for simplicity. For ξ=0, the expected inter-arrival time parameter is independent of the time t elapsed since the last event, which reverberates the fact that the Poisson process is memoryless. For ξ>0, however, it is observed that the expected IAT until the next event increases in both parameters, elapsed time since the last event t and clustering degree ξ. This means in particular, that for ξ>0, the mean time until the next event increases, the further back in the past the last event has occurred.

The memory of a renewal process governed by a generalized Pareto IAT distribution is related to the degree of clustering. If φ denotes the distribution of IATs and t denoptes the time elapsed since the last event, the probability for that to happen, i.e. the probability for the IAT being larger than t, can be given by $P(\tau > t) = 1 - \int_0^t du \varphi(u) = \int_t^\infty du \varphi(u)$ This condition can technically be used for the generation and selection of the distribution function $\varphi_t$, i.e. of the inter-arrival times distribution conditioned on the time elapsed since the last event being t, as $$\varphi_t(t) = \varphi(\tau \mid \tau > t) = \frac{\varphi(t+\tau)}{\int_t^\infty du \, \varphi(u)}$$

Using the conditioned inter-arrival times distribution $\varphi_t$, the system is able to generate the expected value for the inter-arrival time given that t is the time elapsed since the last event as $$\mathbb{E}[\tau \mid \tau > t] = \int_0^\infty ds\, s\varphi_t(s)$$

$$= \frac{\int_0^\infty ds\, s\varphi(t+s)}{\int_t^\infty du\, \varphi(u)}$$

$$= \frac{\int_t^\infty du\, (u-t)\varphi(u)}{\int_t^\infty du\, \varphi(u)}$$

For the present system, $\varphi$ can be set as $\varphi=\text{GPD}(\xi,\sigma,0)$ ($\mu=0$ for the sake of simplicity) and thus $$\mathbb{E}[\tau \mid \tau > t] = \frac{\sigma}{1-\xi} + t\frac{\xi}{1-\xi}$$

Thus, by the present system structure, the average time to the next event indeed depends on the shape parameter as $$\frac{d}{dt}\mathbb{E}[\tau \mid \tau > t] = \frac{\xi}{1-\xi} \geq 0$$

and vanishes if and only if $\xi \to 0$, i.e. in the Poisson limit, as expected.

The following statement shows for any heavy-tailed distributions of inter-arrival times, particularly for a chosen GPD with $\xi>0$: on average, the longer is has been since the last event, the longer it will be until the next event. This statement reverberates clustering: short IATs are more likely to be followed by short ones, while long ones are more likely to be followed by long ones.

Figure 5A:
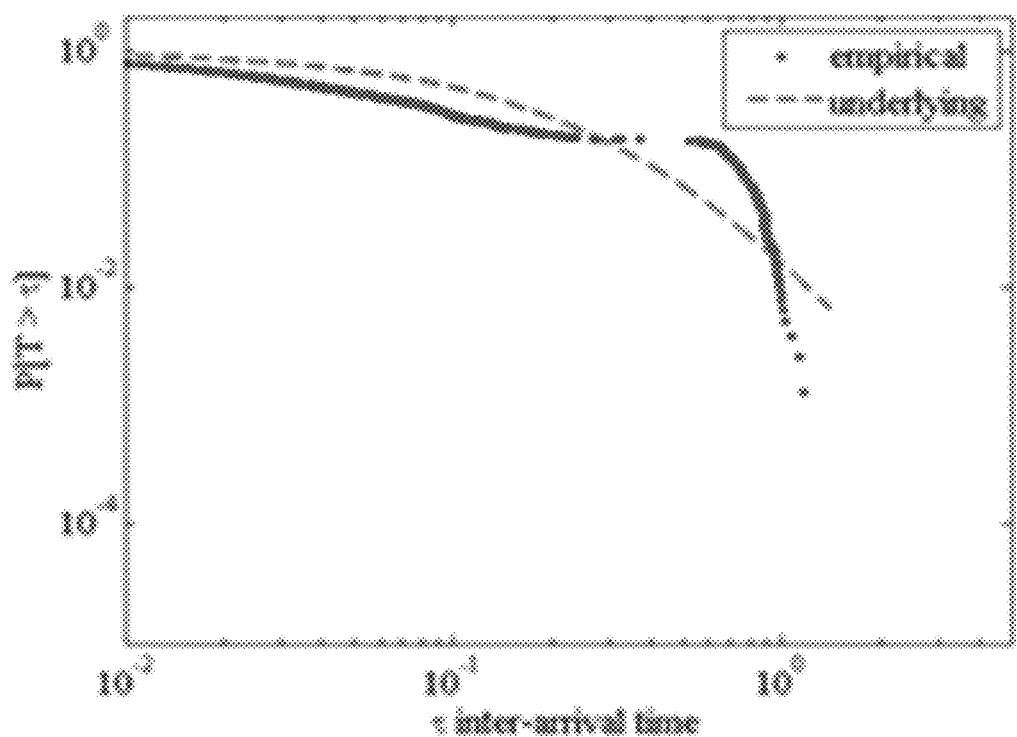
FIG. 5a-c show other block diagrams, schematically illustrating seasonality pattern for Tropical Cyclones North America (TCNA) (FIG. 5a), Winter Storm Europe (WSEU) (FIG. 5b) and Flood US (FIG. 5c). TCNA and WSEU have a pronounced seasonality pattern, while this is less significant for food US.
Figure 5A:
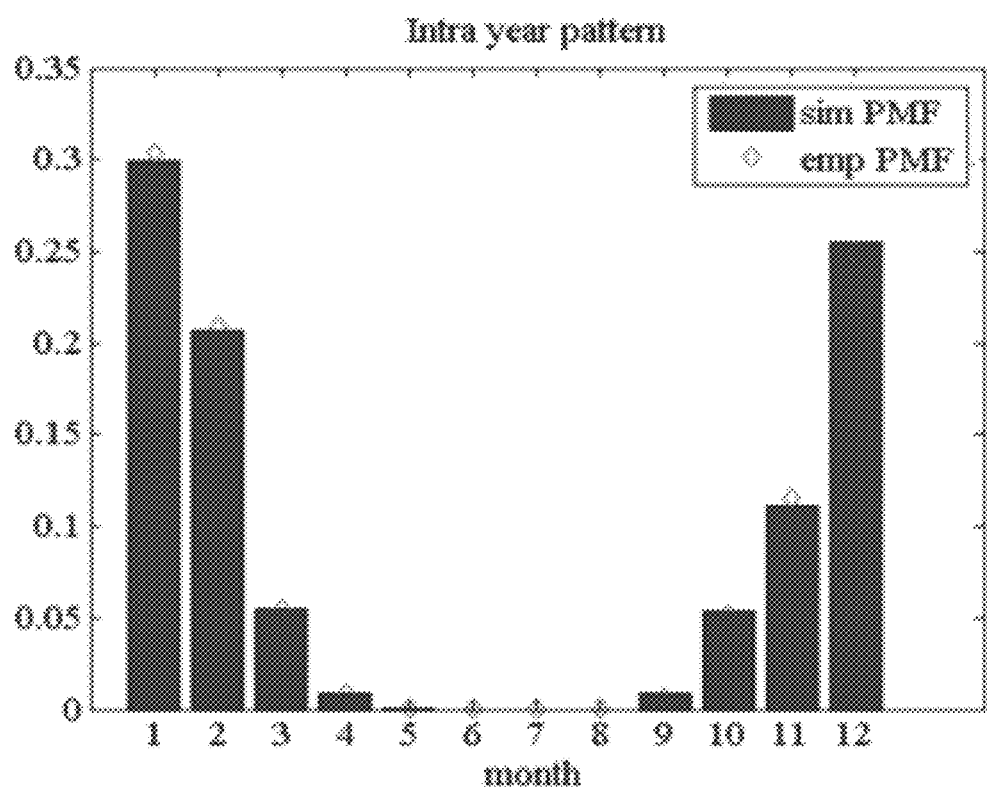
Figure 5B:
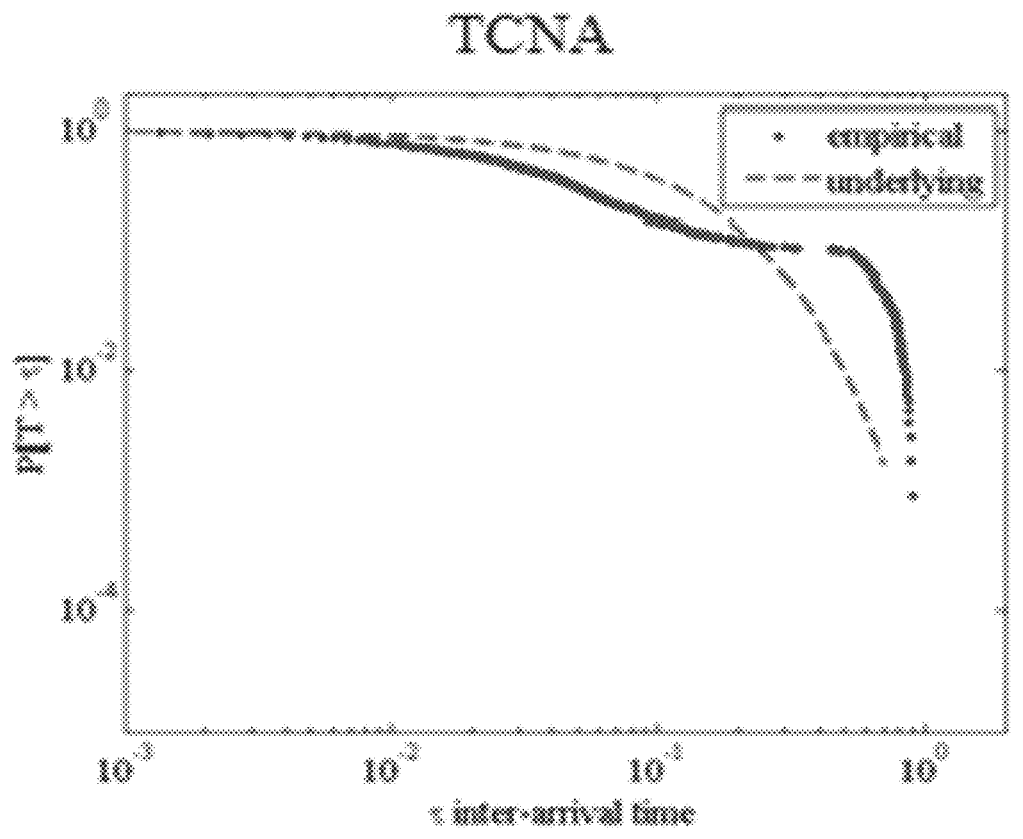
Figure 5B:
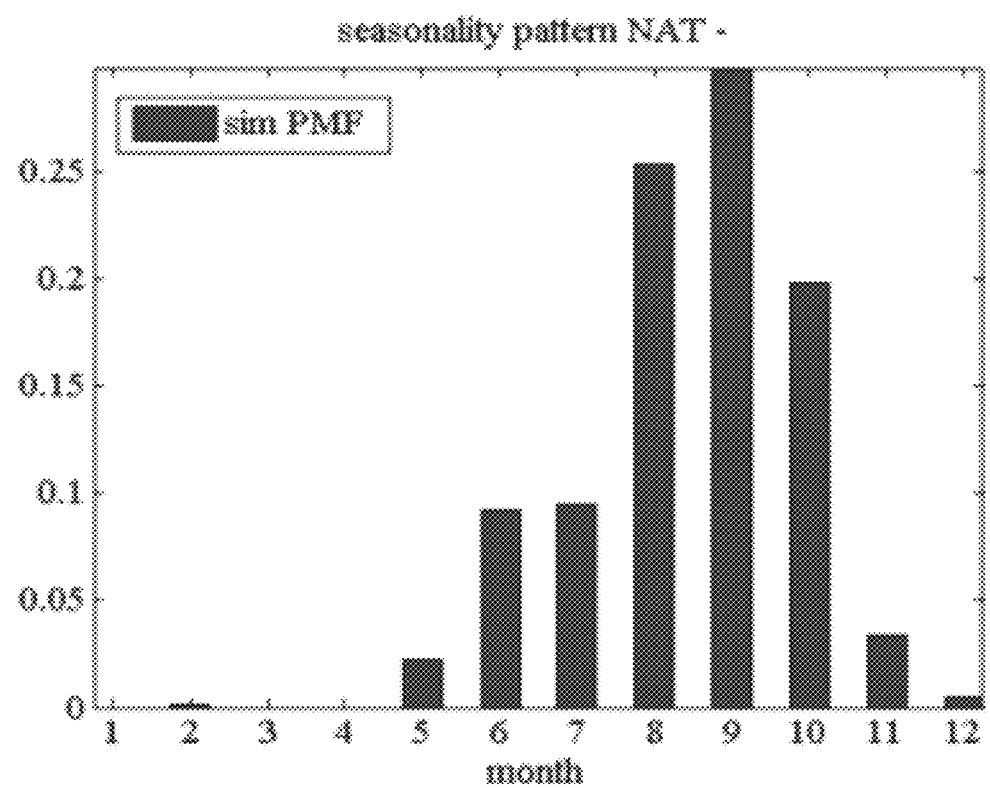
Figure 5C:
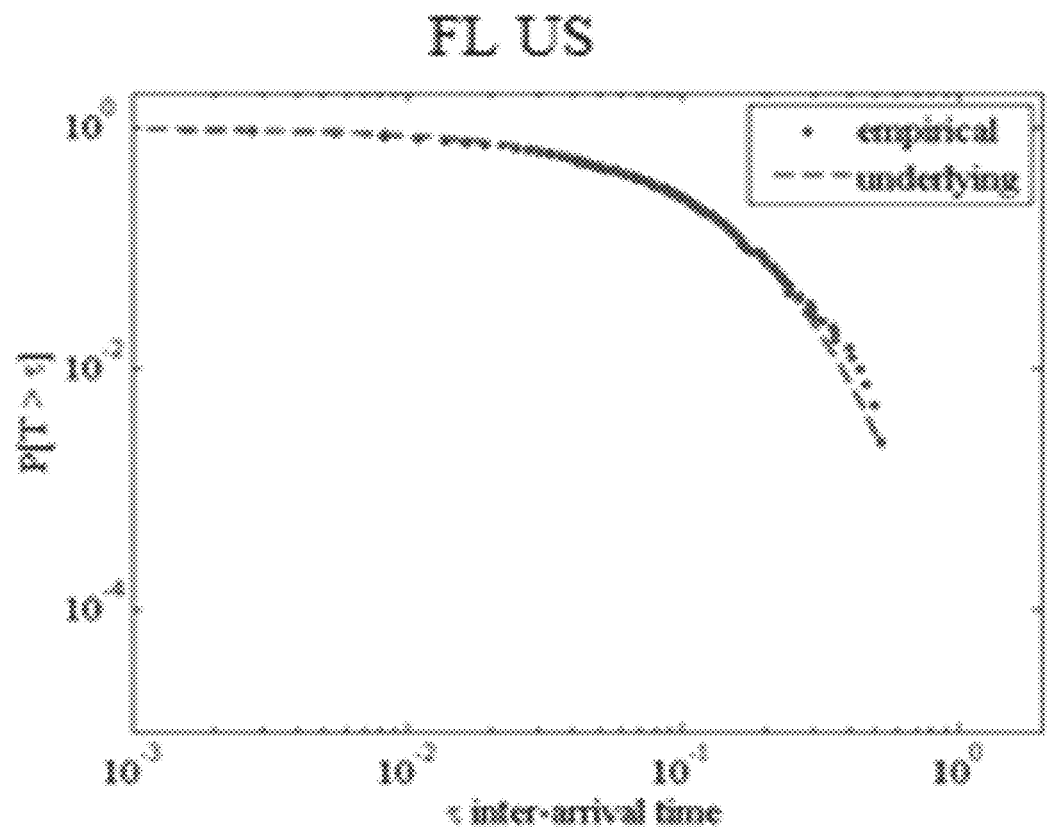
Figure 5C:
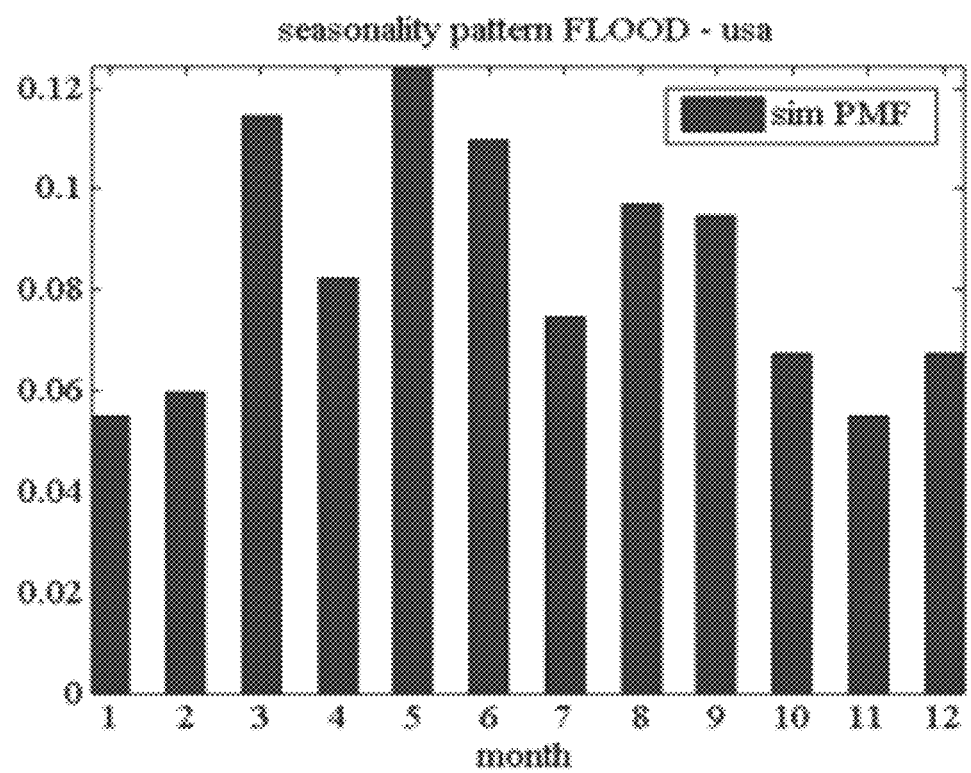

Many natural hazards exhibit a characteristic occurrence pattern over the period of one year. That is, the occurrence of events (at some location) might be bound to certain time periods during the year, e.g. for physical reasons. This occurrence pattern is called seasonality pattern. Seasonality patterns report that the probability for event arrivals are not homogeneously distributed over a year but may show time periods in which event arrivals are more likely, less likely, or even suppressed. WSEU and TCNA are examples for pronounced seasonality patterns. FIG. 5a-c show block diagrams schematically illustrating seasonality pattern for Tropical Cyclones North America (TCNA) (FIG. 5a), Winter Storm Europe (WSEU) (FIG. 5b) and Flood US (FIG. 5c). TCNA and WSEU have a pronounced seasonality pattern, while this is less significant for Flood US. While being interested in inter-arrival times, the question emerges whether seasonality patterns show up in the distribution of IATs. The answer is yes. As seen in FIG. 5, the distribution of empirical IATs (blue dots) shows a "knee-like" deviation from the underlying GDP (red curve). The more pronounced the seasonality pattern is, the more pronounced is the "knee". Therefore, structuring and modelling IATs requires taking into account the seasonality pattern of a peril.

Figure 8:
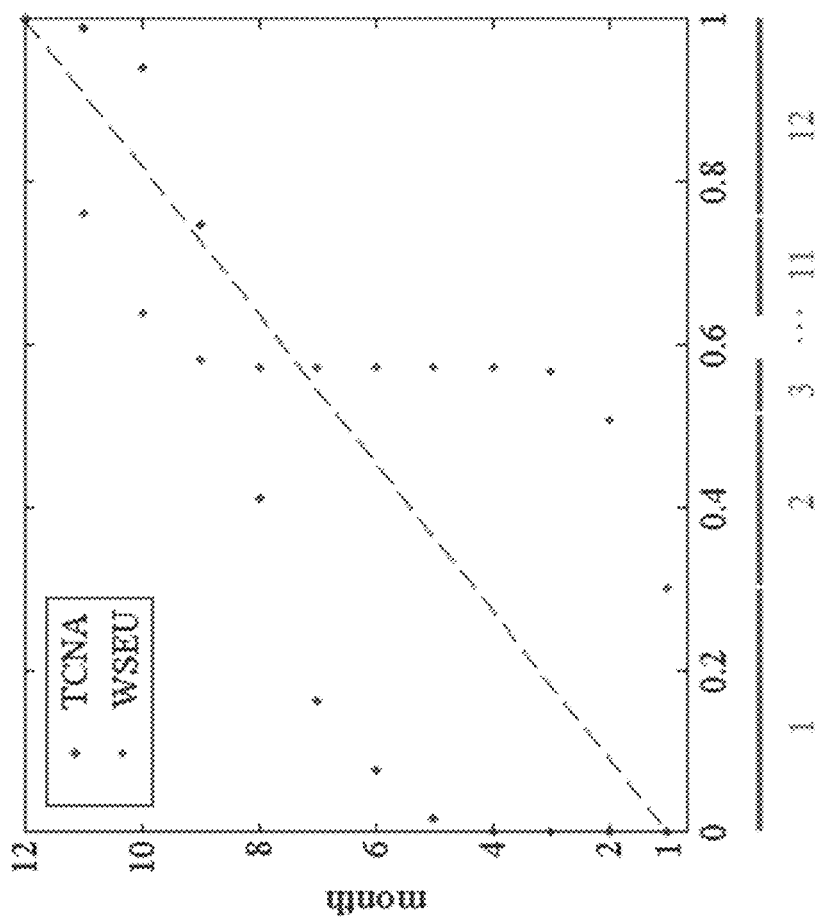
FIG. 8 shows a block diagram, schematically illustrating in an exemplary manner: (A) Left: the "time" axis (black dots) is mapped on the seasonality adjusted time axis. According to FIG. 5a, the range from months 4-9 is mapped on a small interval; corresponding events have a small probability of occurring; (B) Right: the associated mappings S for TCNA and WSEU.
Figure 8:
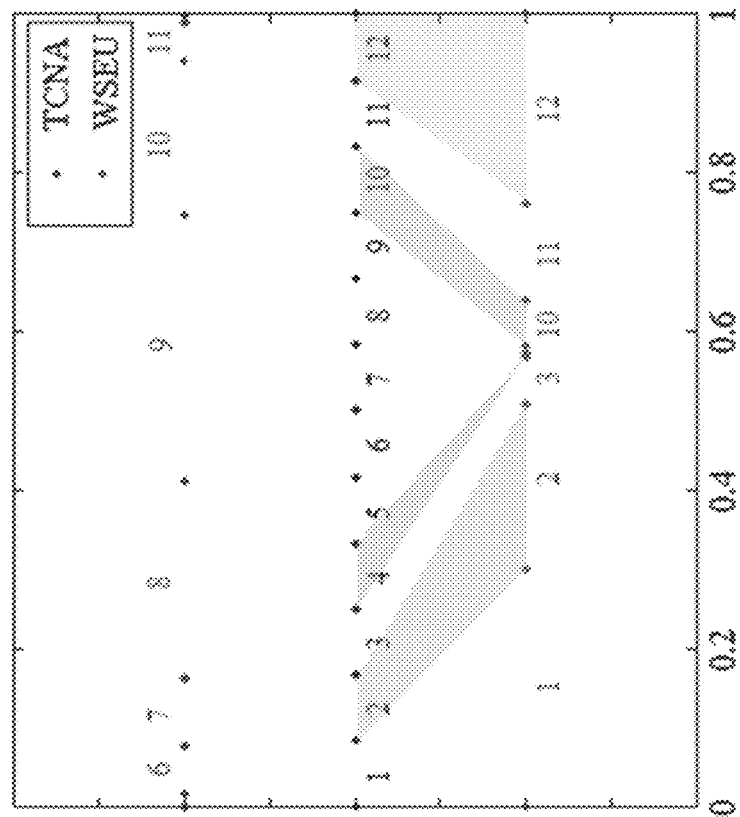
Figure 9:
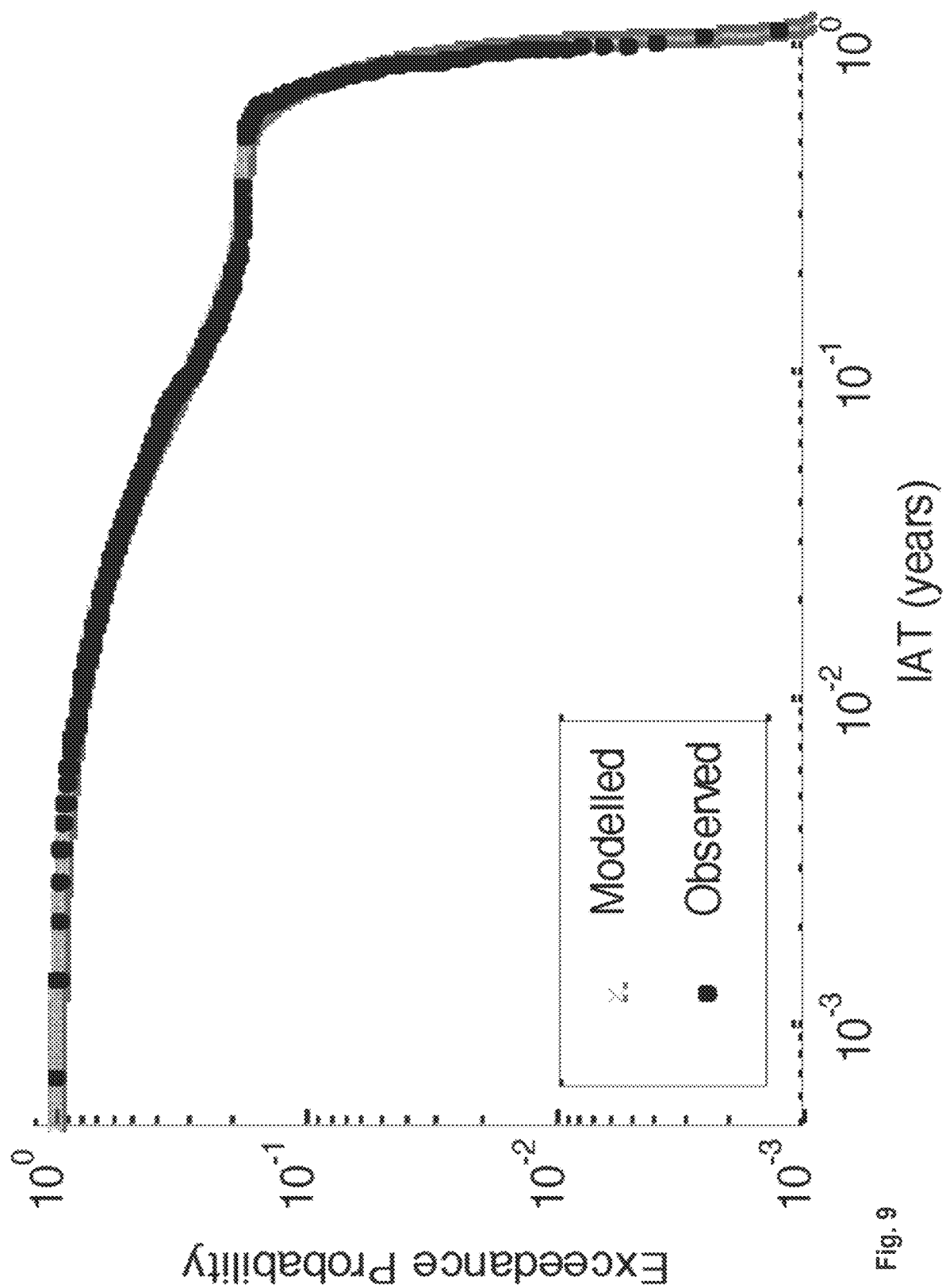
FIG. 9 shows a block diagram, schematically illustrating exemplary constructed time stamps in a way that modelled IATs equal observed IATs in distribution. In the Inter-Arrival Times approach, the backbone of the PLS structure 33 is the construction of time stamps 331, . . . , 333. This is done by based on the distribution of waiting times between consecutive events 311, . . . , 313. These time periods are called inter-arrival times (IAT).

For the technical structuring of seasonality, the seasonality pattern is inscribed into the random process generating IATs by applying a transformation $S^{-1}$, for details see FIG. 4. This local scaling is done in such a way that a month in which no events arrive has weight zero. Analogously, the month's weight is higher, the higher the likelihood that an event may arrive during that month. The action of the local scaling transformation is to distribute the event times 331, . . . , 333 over a year so that the seasonality pattern is reproduced—by construction. The action of this transformation is displayed in FIG. 8 showing a block diagram that schematically illustrates an example: (A) Left: the "time" axis (black dots) is mapped on the seasonality adjusted time axis. Due to FIG. 5, the range from months 4-9 is mapped on a small interval; corresponding events have small probability to occur; (B) Right: the associated mappings S for TCNA and WSEU. As an example may serve Tropical Cyclones North America (TCNA) and Winter Storm Europe (WSEU). Winter storms or blizzards have zero frequency in the months May to August; accordingly, these months receive weights 0. For TCNA the time period from January to April receives zero weight.

For the applied the local time transformation, herein denoted as S, it is important to note, that the inventive system is based on measured and thus observed events, whose arrival times are physical entities, i.e. years, month. On the other hand, the system 1 generates and simulates arrival times in abstract parameter space. Therefore, the system's structure has to construct a relation between physical time and abstract time. The formal difference between both is that physical time has a dimension such as month or hours, while the instances in abstract time are dimensionless; actually they are real numbers. Thus there are technically two levels, which have to be clearly distinguished.

In the system, the transformation S maps the physical time unit year to the (dimensionless) unit interval in the simulation. This is done as follows: $\{\pi_k\}$ denotes a sequence of IATs drawn from some distribution. Then $t_n = \Sigma_{k=1}^n \pi_k$ is the event 'time' of the n-th event. Identifying the integer part of $t_n$ with the year, the remainder codes for the intra-year location. The corresponding unit interval (0, 1) is partitioned into N equal bins m, e.g. if N=12, m=1, . . . , 12 indexes months. Other units are possible such as hours.

The choice of the bin depends on the temporal resolution desired. For the sake of intuition, we call these bins 'month' in the following. $f_m$ denotes the numbers of arrivals in the m-th month. The empirical frequency of arrivals in bin m then is $f_m = f_m/\Sigma_m f_m$. Obviously $\{f_m\}$ is a partition of the unit interval and approximates the probability for an arrival in that month. For the present system, the local time transformation S is defined by $$S: \begin{cases} \{1, N\} \to [0, 1] \\ m \mapsto \sum_{n=1}^m f_m \end{cases}$$

This transformation structure gives each (physical) 'month' a length in the simulation domain, which equals the empirical arrival frequency in that month. Months in which one observes many events, obtain a (relatively) larger portion of the simulation unit. By this technical construction, the frequency distribution of simulated event times is identical to the observed pattern (cf. FIG. 8). The inverse transformation $S^{-1}$ allows to inscribe the empirical seasonality pattern in the system's event generation, which locally scales the 'time' axis according to the seasonality pattern. As an example, consider WSEU. The mapping S for WSEU is indicated by the series of the red dots in FIG. 8, right. These should be compared with the seasonality pattern in FIG. 5a. Windstorms have zero frequency in months 5 to 8; months 5 to 8 have bins with width 0. Obviously, if the seasonal pattern is (almost) homogeneous, i.e. frequencies are the same for all month, then all bins have (almost) the same size, reverberating the fact that all month have (almost) identical probability. This means that S is (close to) a linear mapping. It is important to note, that the mapping S is uniquely determined by the observed data. No further modelling or technical calibration is needed.

Figure 6:
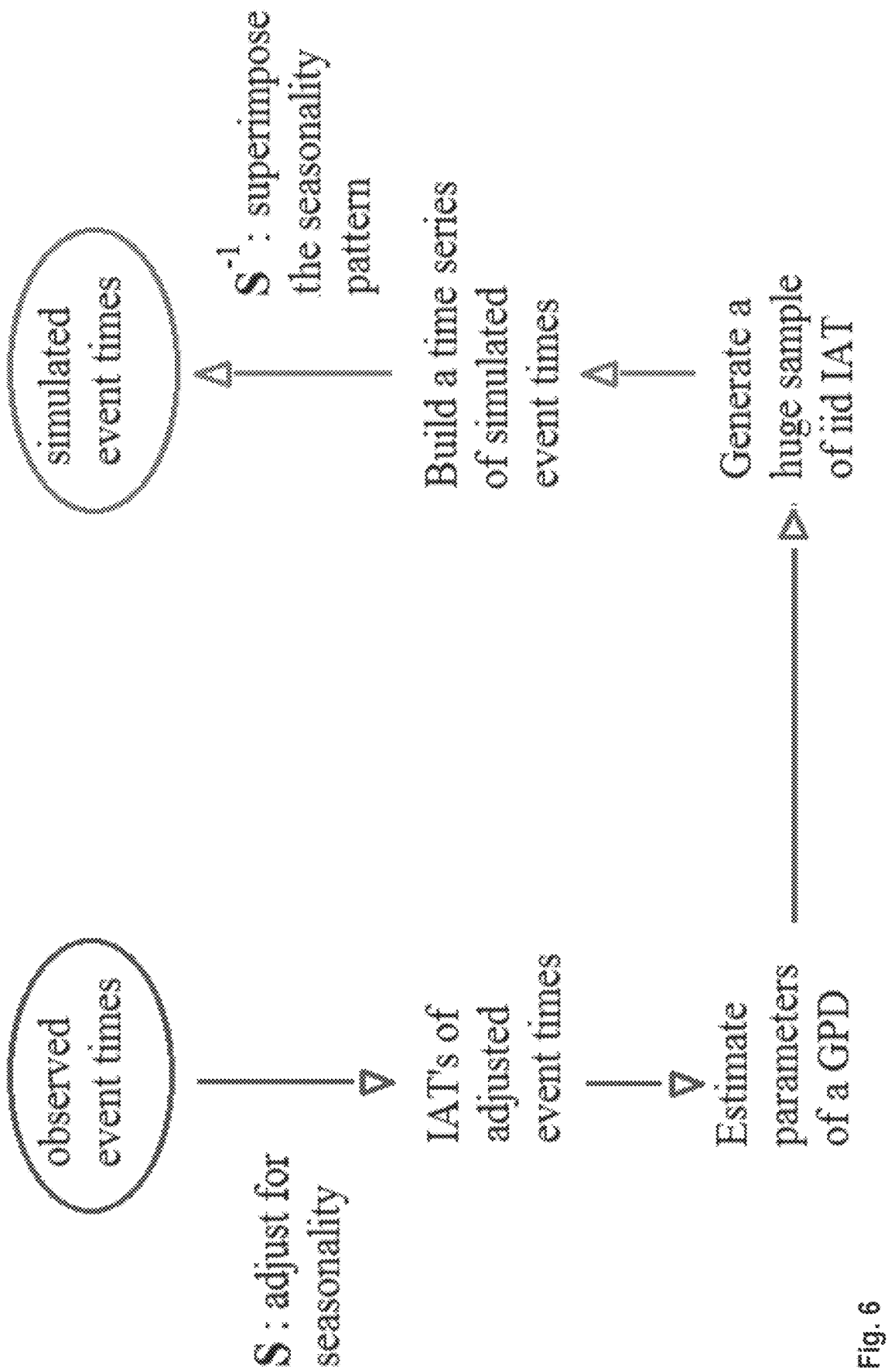
FIG. 6 shows a block diagram, schematically illustrating an exemplary generation of time stamps 331, . . . , 333. The aim is to capture with probabilistic means the time dimensions for single perils, such as hurricane, flood, and earthquake. The technical goal consists in constructing a series of event times (time stamps 331, . . . , 333), identical to historical event times in a probabilistic (distributional) sense. Each event time can be regarded as its own time stamp 331, . . . , 333 of a particular event 311, . . . , 313, which is, in turn, mapped to it. The structure of generation can be schematically summarized as follows: (1) given a time series of observations of historical events 311, . . . , 313, establishing the seasonality pattern by counting how many events fall into which month. While some perils are almost uniformly distributed throughout a given year, other perils, such as WSEU, Flood or TCNA show distinct patterns of occurrence. This is due to their seasonality. System 1 "cleans" the empirical (physical) data for this aspect of seasonality; (2) obtaining the inter-arrival time parameters (IAT) of the adjusted historical data from the cleaned (abstract) data. An estimated or pre-defined Generalized Pareto Distribution (GPD) is matched to this set, giving the estimates for the parameters; i.e. the parameters are automatically estimated if their fit is reasonably good; (3) given these parameters, a large sample of IATs is generated from the GPD, and from this, the ordered set of abstract time stamps 331, . . . , 333 is derived; and (4) the seasonality pattern must be re-established. This results in modelled physical time stamps.

System 1 is now prepared to automatically capture and model time stamps 331, . . . , 333. The aim is to probabilistically structure the time dimension for single perils, such as hurricane, flood, and earthquake. Thus, the aim is to construct a series of event times (time stamps 331, . . . , 333), which is identical to historical event time in a probabilistic (distributional) sense. Each event time can be regarded as the time stamp 331, . . . , 333 of a particular event 311, . . . , 313, which is then mapped to it. The modelling structure can schematically be summarized as: (1) given a time series of observations of historical events 311, . . . , 313, establishing the seasonality pattern by counting how many events 311, . . . , 313 fall into which month. While some perils are almost uniformly distributed over a given year, other events, such as WSEU, Flood or TCNA show distinct patterns of occurrence 1031, . . . , 1034. This is at least due to their seasonality. The system 1 "cleans" the empirical (physical) data for this seasonality; (2) From the cleaned (abstract) data, IATs of the adjusted historical data are obtained. This set is automatically matched to a GPD. Parameters are generated and estimated if the fit is reasonably good; (3) Given these parameter, a large sample of IAT is generated from the GPD, and the ordered set of abstract time stamps 331, . . . , 333 is derived from this sample; and (4) Finally, the seasonality pattern has to be re-established. This results in structured physical time stamps 331, . . . , 333. FIG. 6 shows a block diagram schematically illustrating such an exemplary generation of time-stamps 331, . . . , 333.

Figure 7A:
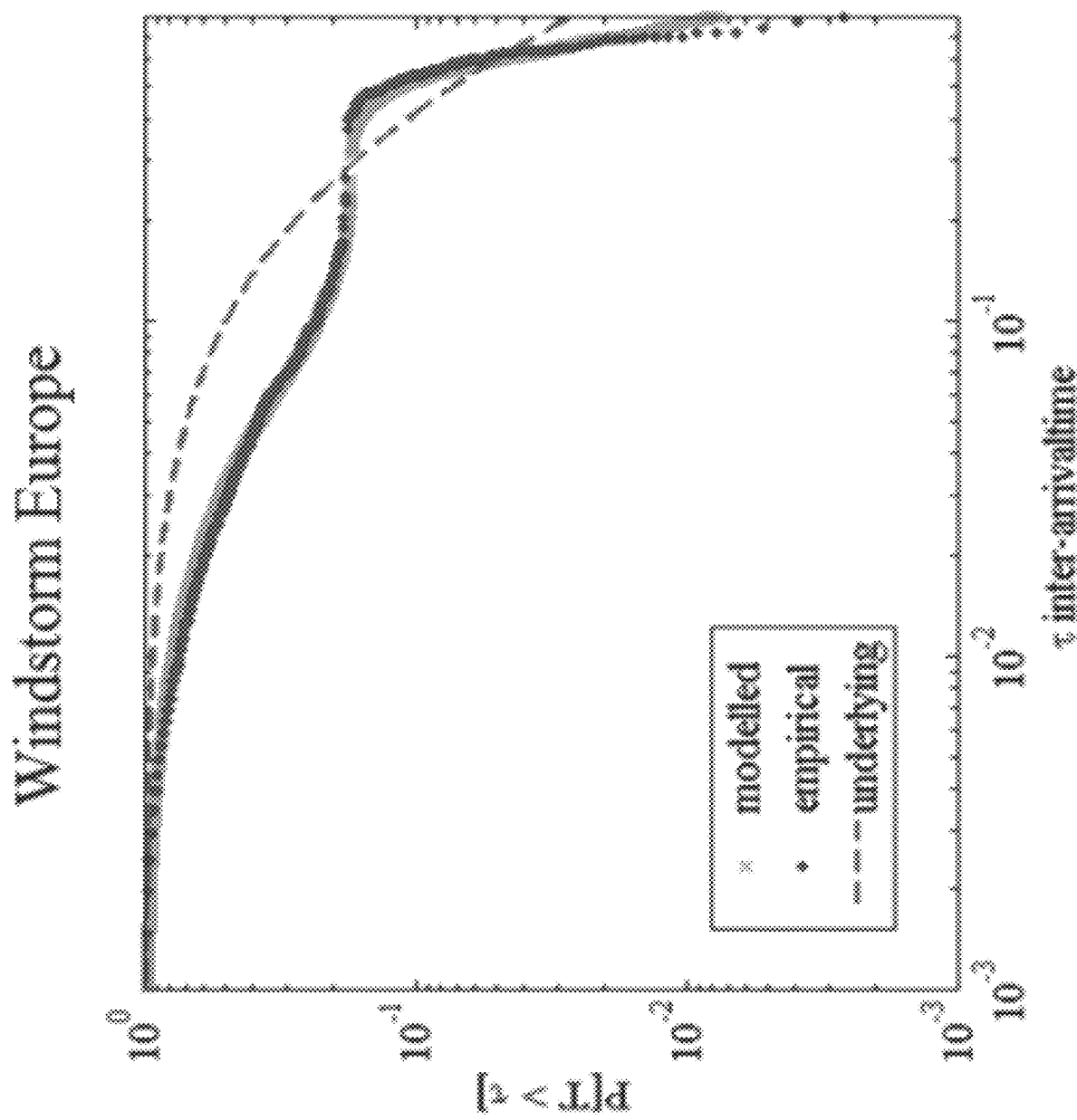
FIGS. 7a and 7b show block diagrams, schematically illustrating an exemplary simulated IAT distribution for two perils, TCNA (FIG. 7a) and WSEU (FIG. 7b). Note that both are subject to a strong seasonality pattern, both being shifted by approximately four months. The distribution of simulated event times (green dots) demonstrates excellent agreement with empirical IATs. The red curve displays the calibrated GPD, step 2 according to FIG. 6.
Figure 7B:
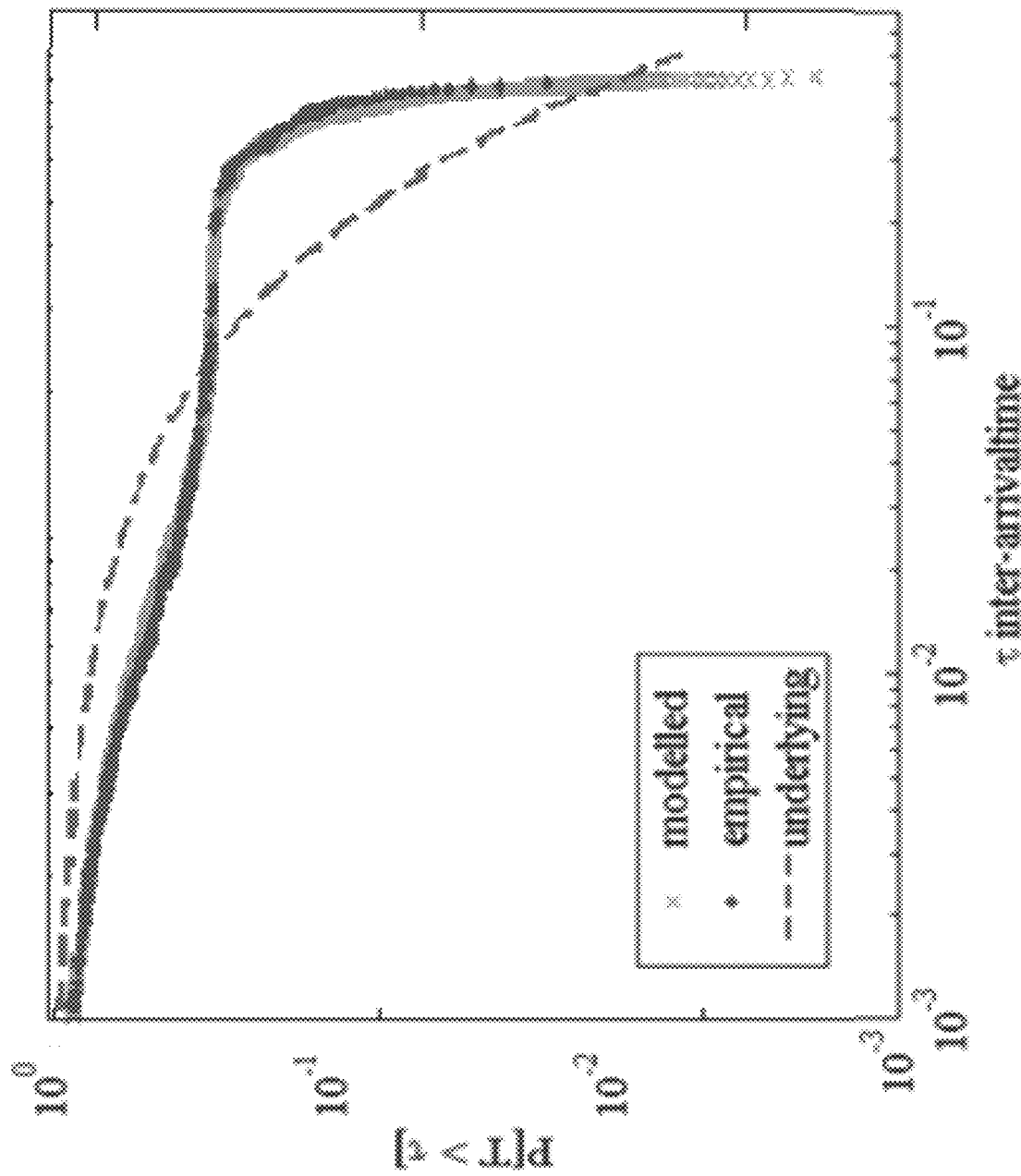

FIGS. 7a and 7b show the simulated IAT distribution 1011 for two perils, TCNA (7a) and WSEU (7b). Note that both are subject to a strong seasonality pattern, both being shifted by approximately four months. The distribution of simulated event times 1011 (green dots) shows an excellent agreement with empirical IATs. The red curve displays the calibrated GPD due to step 2, as discussed above. For FIGS. 7a and 7b and the empirical and simulated IAT distribution 1011 for Tropical Cyclone Northern Atlantic (7a) and Windstorm Europe (7b), the sample size in the simulation is 2 mio in both bases. The red curve shows the GDP, calibrated to the empirical IATs.

The automated, inter-arrival-time-based system 1 can, for example, comprise one or more first risk-transfer systems 11 to provide a first risk-transfer based on said first, generated risk transfer parameters from at least some of risk-exposed units 41, . . . , 45 and/or individual to one of the first risk-transfer systems 11. The first risk-transfer systems 11 can, e.g., comprise a plurality of payment transfer modules 113 configured to receive and store 112 first payment parameters 1121, . . . , 1125 associated with risk-transfer of risk exposures 5 of said risk-exposed units 41, . . . , 45 for a pooling of their risks 51, . . . , 55. An occurred and triggered loss of a risk-exposed unit 41, . . . , 45 is automatically covered by the first risk-transfer system 11 based on the first risk transfer parameters and correlated first payment transfer parameters 1121, . . . , 1125. The automated, inter-arrival-time-based system 1 can further, e.g., comprise a second risk-transfer system 12 for providing a second risk-transfer based on generated second risk-transfer parameters 511, . . . , 515 from one or more of the first risk-transfer systems 11 to the second risk-transfer system 12. The second risk-transfer system 12 can, e.g., comprise second payment transfer modules 123 configured to receive and store 122 second payment parameters 1221, . . . , 1225 for a pooling of the risks of the first risk-transfer systems 11 associated with risk exposures transferred to the first risk-transfer systems 11. An occurred and triggered loss is automatically covered at least partially by the second risk-transfer system 12 based on the second risk transfer parameters 511, . . . , 515 and correlated second payment transfer parameters 1221, . . . , 1225.

LIST OF REFERENCE SIGNS

1 Automated, inter-arrival-time-based system
  10 Central, core circuit
    100 Risk-event driven core aggregator
      1001 Measuring data-driven triggers
    101 IAT-generator
      1011 Estimated or predefined distribution
        10112 Gamma function
    102 Signaling module
    103 Clustering module
      1031 Peril specific temporal clustering
      1033 Time scale factors
      1034 External global large time scale drivers
    104 Trigger-driven score module
  11 First risk-transfer systems
    111 Automated resource pooling system
    112 First data store
      1121, . . . , 1125 First payment parameters
    113 First payment transfer modules
    114 Generated risk transfer profiles
  12 Second risk-transfer system
    121 Automated resource pooling system
    122 Second data store
      1221, . . . , 1225 Second payment parameters
    123 Second payment transfer modules
      1231 Control device
      1232 Activation control parameter
    124 Activation threshold parameter
    125 Predefined loss covering portion
2 Data transmission network
  20 Cellular network grid
  21 Uni- or bidirectional data link
3 Event datastore
  31 Measured hazard set
    311, . . . , 313 Occurring risk-events with measuring parameters
  32 Event loss set (ELS)
    321, . . . , 323 Measured frequency parameters with associated loss
  33 Period loss set (PLS)
    331, . . . , 333 Generated time-stamps
41, . . . , 45 Risk-exposed units or individuals
  401, 402, . . . , 411, 412, . . . Sensors and measuring devices
  421, . . . , 425 Dataflow pathway of the sensors and measuring devices
5 Aggregated risk exposure
  51, . . . , 55 Transferred risk exposures of the risk-exposed units
  61 Predefined risk events related to liability coverage for damages 611, ..., 613 Parameters measuring the occurrence of events 61

62 Predefined risk events related to liability coverage for losses

621, ..., 623 Parameters measuring the occurrence of events 62

63 Predefined risk events related to liability coverage for delay in delivery

631, ..., 633 Parameters measuring the occurrence of events 63

71, ..., 75 Occurred loss associated with the motor vehicles 41, ..., 45

711, ..., 715 Captured loss parameters of measured predefined event 1

721, ..., 725 Captured loss parameters of measured predefined event 2

731, ..., 735 Captured loss parameters of measured predefined event 3

80 Aggregated loss parameter

81 Aggregated payment parameter

82 Variable loss ratio parameter

821 Loss ratio threshold value 90, 91, 92, ... Measuring stations and sensors 911, 912, 913, ... Measured occurring risk-events in time sequence 921, 922, 923, ... Dataflow pathway of the sensors and measuring devices

The invention claimed is:

1. An automated, inter-arrival-time-based system for automated predicting and time-correlated, exposure-based signaling, steering and operating of catastrophic risk-event driven or triggered, automated systems triggered by measured occurrence of catastrophic risk events, having an occurrence rate with a complex clustering structure, the automated, inter-arrival-time-based system comprising:

measuring stations or sensors in loco or satellite image processing for measuring occurring risk-events by measured sensory data, the measuring stations or sensors comprising at least seismometers or seismographs for measuring any ground motion, including seismic waves generated by earthquakes, volcanic eruptions, and other seismic sources, and/or stream gauges in key locations across a specified region, measuring during times of flooding how high water has risen above the gauges to determine flood levels, and/or measuring devices for establishing wind strength, and/or sensors for barometric pressure measurements and/or ocean surface water temperature measurements determining direction a hurricane will travel and potential hurricane's intensity, and/or satellite image measurements estimating hurricane strength by comparing the images with physical characteristics of the hurricane;

a data transmission network for transmitting the measured sensory data of the measuring stations or sensors to a central core circuit; and circuitry configured to measure the occurring risk-events by the measured sensory data and assign the occurring risk-events to a historic hazard set comprising the measured event parameters for each assigned risk-event, wherein to capture and measure the appropriate measured sensory data, the central core circuit comprises a risk-event driven core aggregator with measuring data-driven triggers for triggering, capturing, and monitoring in a data flow pathway of the measuring stations or sensors;

provide the risk-event driven or triggered systems with corresponding risk-exposure or occurrence-prediction parameters or risk-transfer parameters by signal transfer of the central core circuit, for the automated predicting and exposure-based signaling, steering and operating of catastrophic risk-event driven or triggered, automated systems;

generate an event loss set based on measured frequencies with associated losses of said risk-events of the hazard set, each of said risk-events creating a set specific loss;

assemble a period loss set recording event losses of the event loss set and generate time-stamps corresponding to the event losses, wherein the period loss set provides a corresponding time-based log record of the measured events of the event loss set, wherein the time-stamps include a sequence of encode time data and are generated and allocated to each event of the event loss set, and wherein a specific time-stamp identifies an occurrence as a point in time at which a specific event is measured;

structure estimated time-stamps using an estimated or predefined distribution of corresponding generated inter-arrival times parameters, wherein an inter-arrival times parameter captures a waiting time between consecutive events of the period loss set, and wherein the waiting times measure time intervals between two successive measured occurrences of risk-events, the occurrence of risk-events being trackable over time by the time intervals; and assess and generate the corresponding risk-transfer parameters for the signal-transfer based on said period loss set comprising the time-stamps and losses for a specific time frame.

2. The automated, inter-arrival-time-based system according to claim 1, wherein the circuitry is configured such that said estimated or predefined distribution comprises at least peril-specific temporal clustering or seasonal occurrence patterns.

3. The automated, inter-arrival-time-based system according to claim 2, wherein the circuitry is configured to automatically capture temporal correlations between perils through a seasonality-dependent distribution structure if both of the perils are subject to the related seasonal occurrence pattern.

4. The automated, inter-arrival-time-based system according to claim 1, wherein the circuitry is configured such that said estimated or predefined distribution is further structured based on relevant time scale factors comprising at least El Niño/Southern Oscillation (ENSO) or Atlantic Multidecadal Oscillation (AMO) or North Atlantic Oscillation (NAO) or global warming return period gradients.

5. The automated, inter-arrival-time-based system according to claim 1, wherein the circuitry is configured to take into account an impact of external global large time scale drivers implicitly by using an observed history for calibration of the time-stamps for atmospheric perils.

6. The automated, inter-arrival-time-based system according to claim 1, wherein the circuitry is configured to further structure said estimated or predefined distribution by dynamically assigning and measuring leading risk indicators for dynamic adaption of the occurrence risk.

7. The automated, inter-arrival-time-based system according to claim 1, wherein the circuitry is configured to apply the automated, inter-arrival-time-based system independently to individual natural hazards.

8. The automated, inter-arrival-time-based system according to claim 1, wherein the circuitry is configured to structure said estimated or predefined distribution by a generalized Pareto distribution (GPD), the GPD distributed inter-arrival times parameters fitting the measured or empirical historic hazard set.

9. The automated, inter-arrival-time-based system according to claim 8, wherein the circuitry is configured to scale the GPD by a random scale parameter $\lambda$, wherein $\lambda$ has a mean, a distribution, and externally induced fluctuations, and wherein the distribution of $\lambda$ around the mean is set by externally induced fluctuations of $\lambda$.

10. The automated, inter-arrival-time-based system according to claim 9, wherein the circuitry is configured such that the operational setting of the scale parameter $\lambda$ comprises at least a first technical boundary condition that the scale parameter $\lambda$ lies within a positive value range and a second technical boundary condition that the scale parameter $\lambda$ takes a unique most probable value, wherein by the first technical boundary condition and the second technical boundary condition, said estimated or predefined distribution is set to a unimodal distribution with non-negative support for the random scale parameter $\lambda$.

11. The automated, inter-arrival-time-based system according to claim 1, wherein the circuitry is configured such that for the setting of the time-stamps, the estimated or predefined distribution is a generalized Pareto distribution whose physically relevant parameter space comprises a technical boundary conditions of (i) a lower threshold of the inter-arrival times of zero, (ii) a Gamma function of the estimated or predefined distribution that takes a unique most probable value, and (iii) a mean inter-arrival time that exists with a shape parameter fulfilling $0<\xi<1$.

12. The automated, inter-arrival-time-based system according to claim 1, wherein the circuitry is configured to provide a first risk-transfer based on said first, generated risk transfer parameters from at least some of risk-exposed units to one of the first risk-transfer systems, wherein the first risk-transfer systems comprise a plurality of payment transfer modules configured to receive and store first payment parameters associated with risk-transfer of risk exposures of said risk-exposed units for pooling of their risks, and wherein an occurred and triggered loss of a risk-exposed unit is automatically covered based on the first risk transfer parameters and correlated first payment transfer parameters.

13. The automated, inter-arrival-time-based system according to claim 12, wherein the circuitry is configured to provide a second risk-transfer based on generated second risk-transfer parameters from one or more of the first risk-transfer systems to the second risk-transfer system, wherein the second risk-transfer system comprises second payment transfer modules configured to receive and store second payment parameters for pooling of the risks of the first risk-transfer systems associated with risk exposures transferred to the first risk-transfer systems, and wherein an occurred and triggered loss is automatically covered at least partially by the second risk-transfer system based on the second risk transfer parameters and correlated second payment transfer parameters.

14. A method for implementing an automated, inter-arrival-time-based system for automated predicting and time-correlated, exposure-based signaling, steering and operating of catastrophic risk-event driven or triggered, automated systems triggered by measured occurrence of catastrophic risk events, having an occurrence rate with a complex clustering structure, the method comprising:

measuring, by measuring stations or sensors in loco or satellite image processing, occurring risk-events by measured sensory data, the measuring stations or sensors comprising at least seismometers or seismographs for measuring any ground motion, including seismic waves generated by earthquakes, volcanic eruptions, and other seismic sources, and/or stream gauges in key locations across a specified region, measuring during times of flooding how high water has risen above the gauges to determine flood levels, and/or measuring devices for establishing wind strength, and/or sensors for barometric pressure measurements and/or ocean surface water temperature measurements determining direction a hurricane will travel and potential hurricane's intensity, and/or satellite image measurements estimating hurricane strength by comparing the images with physical characteristics of the hurricane;

transmitting, by a data transmission network, the measured sensory data of the measuring stations or sensors to a central core circuit;

measuring, by circuitry, the occurring risk-events by the measured sensory data and assign the occurring risk-events to a historic hazard set comprising the measured event parameters for each assigned risk-event, wherein to capture and measure the appropriate measured sensory data, the central core circuit comprises a risk-event driven core aggregator with measuring data-driven triggers for triggering, capturing, and monitoring in data flow pathway of the measuring stations or sensors;

providing, by the circuitry, the risk-event driven or triggered systems with corresponding risk-exposure or occurrence-prediction parameters or risk-transfer parameters by signal transfer of the central core circuit, for the automated predicting and exposure-based signaling, steering and operating of catastrophic risk-event driven or triggered, automated systems;

generating, by the circuitry, an event loss set based on measured frequencies with associated losses of said risk-events of the hazard set, each of said risk-events creating a set specific loss;

assembling, by the circuitry, a period loss set recording event losses of the event loss set and generating, by the circuitry, time-stamps corresponding to the event losses, wherein the period loss set provides a corresponding time-based log record of the measured events of the event loss set, wherein the time-stamps include a sequence of encode time data and are generated and allocated to each event of the event loss set, and wherein a specific time-stamp identifies an occurrence as a point in time at which a specific event is measured;

structuring, by the circuitry, estimated time-stamps using an estimated or predefined distribution of corresponding generated inter-arrival times parameters, wherein an inter-arrival times parameter captures a waiting time between consecutive events of the period loss set, and wherein the waiting times measure time intervals between two successive measured occurrences of risk-events, the occurrence of risk-events being trackable over time by the time intervals; and assessing and generating, by the circuitry, the corresponding risk-transfer parameters for the signal-transfer based on said period loss set comprising the time-stamps and losses for a specific time frame.

15. The automated, inter-arrival-time-based system according to claim 1, wherein the catastrophic risk-event driven or triggered systems are automated catastrophic risk-event driven or triggered risk-transfer systems, wherein the automated catastrophic risk-event driven or triggered risk-transfer systems are provided with corresponding risk-transfer parameters for automated risk-transfer and/or automated risk-event cover by the signal transfer of the central core circuit.

\* \* \* \* \*